United States Patent
Doi

(10) Patent No.: US 8,090,682 B2
(45) Date of Patent: Jan. 3, 2012

(54) METHOD AND DEVICE FOR EDITING COMPOSITE CONTENT FILE AND REPRODUCTION APPARATUS

(75) Inventor: Kazumi Doi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 11/978,676

(22) Filed: Oct. 30, 2007

(65) Prior Publication Data

US 2008/0147700 A1   Jun. 19, 2008

(30) Foreign Application Priority Data

Dec. 15, 2006   (JP) ................................. 2006-338947

(51) Int. Cl.
*G06F 7/00*   (2006.01)
(52) U.S. Cl. ........................................ 707/610; 707/690
(58) Field of Classification Search .................. 707/610, 707/690
See application file for complete search history.

(56) References Cited

U.S. PATENT DOCUMENTS

| | | | | |
|---|---|---|---|---|
| 5,054,940 A * | 10/1991 | Momose et al. | ............... | 384/193 |
| 5,467,288 A * | 11/1995 | Fasciano et al. | ............... | 715/716 |
| 5,784,572 A * | 7/1998 | Rostoker et al. | ............... | 709/247 |
| 5,983,241 A * | 11/1999 | Hoshino | ............................... | 1/1 |
| 6,148,140 A | 11/2000 | Okada et al. | | |
| 6,262,777 B1 * | 7/2001 | Brewer et al. | ................. | 348/515 |
| 6,480,234 B1 | 11/2002 | Sasaki et al. | | |
| 7,054,546 B2 * | 5/2006 | Murakami et al. | ............... | 386/98 |
| 2002/0035732 A1 * | 3/2002 | Zetts | ............................. | 725/148 |
| 2002/0071654 A1 * | 6/2002 | Notoya et al. | .................... | 386/65 |
| 2003/0021298 A1 * | 1/2003 | Murakami et al. | ............ | 370/535 |
| 2003/0066094 A1 * | 4/2003 | van der Schaar et al. | ...... | 725/151 |
| 2003/0198256 A1 * | 10/2003 | Wang et al. | ...................... | 370/503 |
| 2003/0221014 A1 * | 11/2003 | Kosiba et al. | .................. | 709/231 |
| 2004/0001591 A1 * | 1/2004 | Mani et al. | ..................... | 380/210 |
| 2004/0047619 A1 | 3/2004 | Fujiwara | | |
| 2005/0054287 A1 * | 3/2005 | Kim | ............................... | 455/3.05 |
| 2005/0108233 A1 * | 5/2005 | Metsatahti et al. | ................ | 707/9 |
| 2006/0165180 A1 * | 7/2006 | Koyama et al. | ........... | 375/240.23 |
| 2006/0288027 A1 * | 12/2006 | Murakami et al. | ............. | 707/101 |
| 2007/0050517 A1 * | 3/2007 | Doi | ............................... | 709/236 |
| 2007/0067472 A1 * | 3/2007 | Maertens et al. | .............. | 709/230 |
| 2007/0078883 A1 * | 4/2007 | Hayashi et al. | ................ | 707/102 |

FOREIGN PATENT DOCUMENTS

EP   0 644 692   3/1995
(Continued)

OTHER PUBLICATIONS

C. Ward et al. "Seamless Splicing for MPEG-2 Transport Stream Video Servers" SMPTE Journal, SMPTE Inc., US, vol. 108, No. 12, Dec. 1999, pp. 873-879.
Japanese Official Communication dated Feb. 15, 2011, for corresponding Japanese Patent Application No. 2006-338947, two (2) pages.

*Primary Examiner* — Cheyne Ly
(74) *Attorney, Agent, or Firm* — Fujitsu Patent Center

(57) ABSTRACT

A composite content file editing method includes the steps of dividing each media data included in the composite content file on the time base so as to generate a first composite content file to be reproduced first on the time base and a second composite content file to be reproduced later, and adding, as synchronizing information, information about a position shift on the time base at reproduction start of each media data included in the second composite content file to the second composite content file.

2 Claims, 22 Drawing Sheets

FOREIGN PATENT DOCUMENTS

| | | |
|---|---|---|
| JP | 6-348580 A | 12/1994 |
| JP | 2005-86826 | 3/2005 |
| JP | 2006-113735 A | 4/2006 |
| WO | 2006/009275 | 1/2006 |

\* cited by examiner

| ITEM | DETAILS | |
|---|---|---|
| SYNCHRONIZING INFORMATION TAG | Sync | |
| SYNCHRONIZING INFORMATION SIZE | **Byte | |
| CONTINUOUS FILE INFORMATION | http://*/ | ~DTF |
| HEAD PICTURE CORRECTION | **msec | ~DTT |
| LATER PICTURE CORRECTION | **msec | ~DTB |

| ITEM | DETAILS | |
|---|---|---|
| SYNCHRONIZING INFORMATION TAG | Sync | |
| SYNCHRONIZING INFORMATION SIZE | 100Byte | |
| CONTINUOUS FILE INFORMATION | http://www.aaa.co.jp/File2 | ~DTF1 |
| HEAD PICTURE CORRECTION | 0msec | ~DTT1 |
| LATER PICTURE CORRECTION | −10msec | ~DTB1 |

DT2

(B)

| ITEM | DETAILS | |
|---|---|---|
| SYNCHRONIZING INFORMATION TAG | Sync | |
| SYNCHRONIZING INFORMATION SIZE | 94Byte | |
| CONTINUOUS FILE INFORMATION | Null | ~DTF2 |
| HEAD PICTURE CORRECTION | 10msec | ~DTT2 |
| LATER PICTURE CORRECTION | 6msec | ~DTB2 |

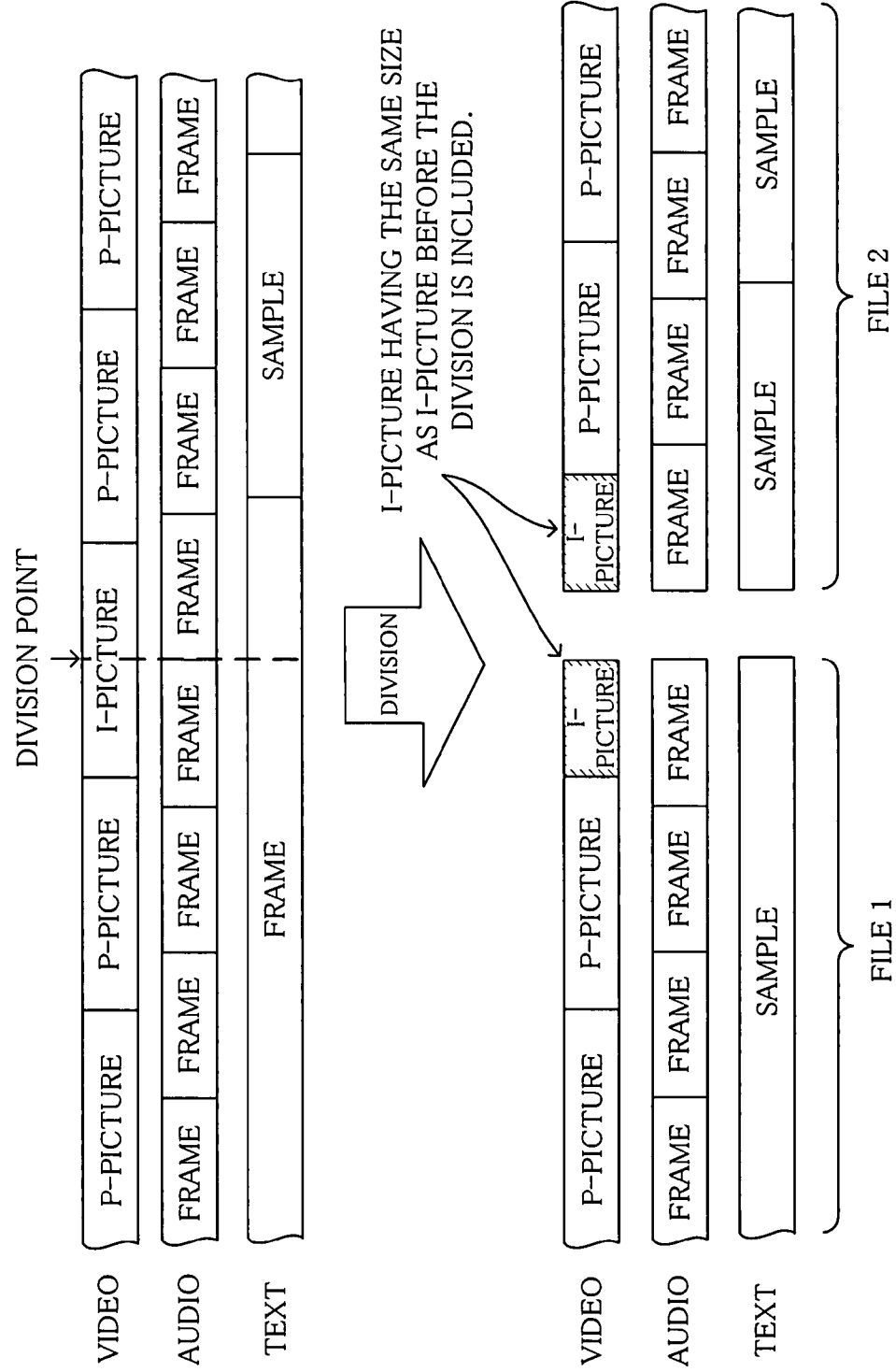

METHOD AND DEVICE FOR EDITING COMPOSITE CONTENT FILE AND REPRODUCTION APPARATUS

BACKGROUND OF THE INVENTION

1. Field of the Invention

The present invention relates to a method and device for editing a composite content file including a plurality of types of multiplexed media data, and to a reproducing apparatus for the composite content file.

2. Description of the Prior Art

Recently, a composite content file including a plurality of types of multiplexed media data such as video data, audio data or text data has been used in a content delivery service or a streaming broadcasting directed to mobile terminals. One of file formats of the composite content file is the MP4 file format (hereinafter referred to as "MP4") that is defined in an article of Part 14 of the ISO/IEC 14496 standard.

The system layer of MP4 includes a plurality of mixed types of media (media data) and is provided with a header portion that stores information such as conditions for reproducing the media and a media data portion that stores only a media stream. In this system layer, individual media are stored in a packet so as to be multiplexed in the temporal order. The header portion (moov box) that includes media information as header information of a stored packet and the media data portion (media data box) that includes media data itself are completely separated from each other. In this respect, MP4 is different from a system layer such as MPEG-2 PS or TS.

FIG. 20 is a diagram showing an example of a conventional MP4 file format FT1.

As shown in FIG. 20, a file type box BXA of the MP4 file format FT1 stores information indicating compatibility of the file. A moov box BXB that is a header portion stores information about a reproduction condition of each media data stored in a media data box BXC that will be described later, which includes position information, time information, size information and the like of a media frame. The media data box BXC stores media data such as video data, audio data, text data or the like.

The MP4 file format includes the time information of each media frame, which is not reproduction time but a reproduction time length. In other words, the time information indicates, for example, that a first frame of the video data is reproduced for ○○ milliseconds and a second frame is reproduced for ΔΔ milliseconds. Therefore, video data is reproduced only by the reproduction time length of the video data, while audio data is reproduced only by the reproduction time length of the audio data.

A user of a mobile terminal can receive delivery of such a composite content file of the MP4 file format by his or her mobile terminal and reproduce the file. However, a maximum size of content that a mobile terminal can handle depends on a type of the mobile terminal. Therefore, if a size of the content exceeds the maximum size of content that the mobile terminal can handle, a server that delivers the content is required to divide the content into a plurality of files (composite content files), while the mobile terminal is required to reproduce the plurality of files continuously.

As a device that divides an MMS message having a size above a transmission capacity of a server into files having a size that the mobile terminal can transmit, there is proposed a device that is described in U.S. patent application publication No. 2005/0054287. The device disclosed in the publication includes a receiving portion that receives an input such as an image signal, an audio signal and the like, a control portion that controls individual portions of the mobile terminal and encodes the image signal and the audio signal received via the receiving portion into multimedia data, which is divided into a specific size and stored as the divided data in an designated order, a buffer that stores the multimedia data and the divided data as individual files, a memory portion that stores the individual files stored in the buffer by the control portion in corresponding areas in accordance with the order, an output portion that delivers operational information of the mobile terminal, the image signal or the audio signal in accordance with the control portion, and a radio frequency portion that transmits the files stored in the memory portion by wireless.

However, in the conventional method, since the synchronizing information of each media data is not stored as information about the reproduction condition of each of the divided media data, there may be a problem as follows.

FIGS. 21 and 22 are diagrams showing examples of the method for dividing the media data.

Positions on a time base that divide each media data included in the content (hereinafter referred to as "division points") are usually based on the video data and are usually positions of boundaries between pictures of the video data as shown in FIG. 21. The reason is that division of the video data should be performed so that an I-picture frame that can be reproduced by itself becomes a head of the video data after division, and therefore division points depend on positions of the I-picture necessarily.

In this case, therefore, if a filing section of an elementary stream is designated for example, it is necessary to include data of the designated section completely. As a result, a section of each media has a range little wider than that including it.

However, there is very little possibility that the division point of the video data decided as described above matches a boundary between audio frames completely. Therefore, as shown in FIG. 21, the audio data is divided at a boundary between frames that is closest to the position corresponding to the division point of the video data.

In this case, when the individual media data divided as described above are reproduced, if heads of media data at the reproduction start are justified, a reproduction timing of the audio data is delayed from that of the video data by shift time T1 of the division point in a second file. In addition, reproduction end timings of the individual media data are shifted in a first file and the second file.

Such a shift of timing causes an uncomfortable feeling that the user may have, which includes a situation that a motion of the picture does not match the sound, a situation that the sound is still ringing even when the picture is finished, a situation that a sound is interrupted, and the like.

In addition, a method may be considered for matching positions on a time base between the video data and the audio data when they are reproduced, in which each media data is divided at boundaries between audio frames as shown in FIG. 22.

In this case, however, the video data is to be divided in the I-picture frame. Then, since each of the two divided I-picture frames has to be reproducible by itself, a complete I-picture frame is to be used for each of them.

Therefore, when the division as described above is performed, each of the first and the second files includes the I-picture having a large size so that reproduction time of content included in one file becomes short.

SUMMARY OF THE INVENTION

An object of the present invention is to provide method and device for editing a composite content file, which do not make a user feel a shift between a picture and a sound when they are reproduced after the composite content file is divided.

A method according to one aspect of the present invention includes the steps of dividing each media data included in the composite content file on the time base so as to generate a first composite content file to be reproduced first on the time base and a second composite content file to be reproduced later, and adding, as synchronizing information, information about a position shift on the time base at reproduction start of each media data included in the second composite content file to the second composite content file.

Preferably, information about a position shift on the time base at reproduction end of each media data included in the first composite content file may be added to the first composite content file as the synchronizing information.

Since the synchronizing information is provided, a shift between a picture and a sound can be cancelled by performing correction during reproduction based on the synchronizing information.

A reproducing apparatus according to one aspect of the present invention includes a synchronizing information obtaining portion that obtains synchronizing information that is added to the composite content file, a position shift information extracting portion that extracts information about a position shift on the time base during reproduction of each media data from the synchronizing information, a file information extracting portion that extracts file information of a composite content file to be reproduced continuously next to the composite content file from the synchronizing information, a correction portion that corrects reproduction time during reproduction of each media data based on the extracted information about a position shift on the time base, and a media data obtaining portion that reads out the next composite content file based on the extracted file information and obtains media data that succeeds each media data that has been reproduced among the individual media data included in the composite content file that is being reproduced so as to reproduce the media data continuously when the reproduction of the composite content file that is being reproduced is finished.

If file information of the composite content file to be reproduced next continuously is extracted, the next composite content file is read out based on the file information so that the continuous reproduction is performed.

According to the present invention, it is possible that a user does not feel a shift between a picture and a sound when a composite content file is divided and reproduced.

BRIEF DESCRIPTION OF THE DRAWINGS

FIG. 8 is a diagram showing an example of synchronizing information.

FIG. 13 is a diagram showing an example of synchronizing information for the content file after the division.

FIG. 22 is a diagram showing an example of a method for dividing the media data.

DESCRIPTION OF THE PREFERRED EMBODIMENTS

The invention will now be described in detail with reference to the attached drawings.

Figure 1:
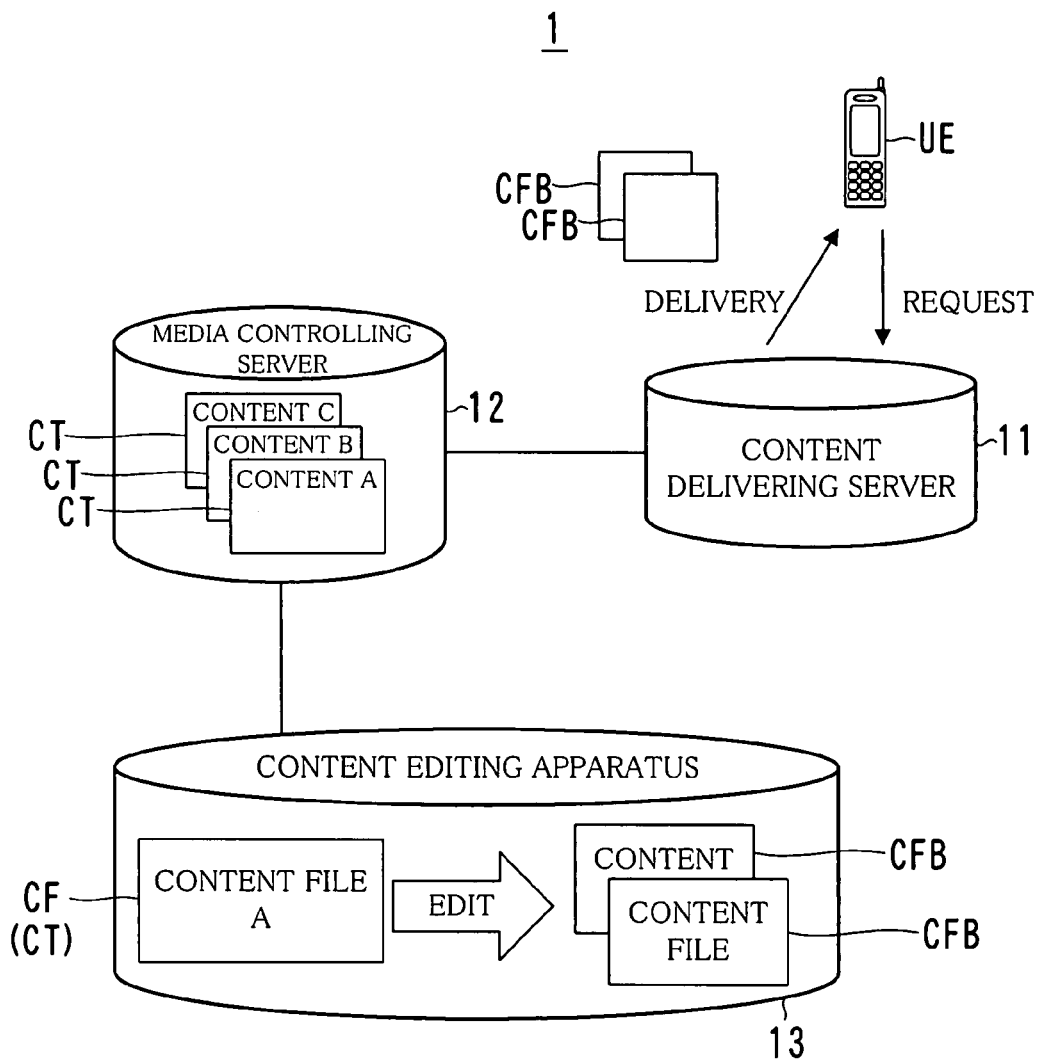
FIG. 1 is a diagram showing an example of a general structure of a content delivering system.

In FIG. 1, the content delivering system 1 includes a content delivering server 11, a media controlling server 12, the content editing apparatus 13 and the like.

The content delivering server 11 is connected to a mobile communication network (not shown) including gateways, exchanges, a base station control unit, base stations and the like. The content delivering server 11 delivers content responding to a request from the mobile terminal UE. In other words, the content delivering server 11 requests the media controlling server 12 to send the content requested by the mobile terminal UE, and it performs a process for transmitting the content received from the media controlling server 12 to the mobile terminal UE.

The media controlling server 12 manages many content CT and transmits designated content CT to the content delivering server 11 responding to a request from the content delivering server 11. The media controlling server 12 can store and manage various media and various formats of data as the content CT. The content CT includes a composite content file in which a plurality of types of media data are multiplexed, for example. The composite content file is made up of a combination of different types of media data including video data, audio data, text data and the like.

The media controlling server 12 encodes the content CT into a format that is suitable for delivery, if necessary, or converts the same into a file of a format that is suitable for delivery. In addition, if a size of the content CT or the file is too large to be delivered to the mobile terminal UE that made the request, the media controlling server 12 requests the content editing apparatus 13 to divide it into a plurality of files and to edit the same.

The content editing apparatus 13 generates (edits) two or more content files (composite content files) CFB from the content CT responding to the request from the media controlling server 12, and it sends the generated content files CFB to the media controlling server 12.

In other words, for example, the content editing apparatus 13 divides each of the media data included in the content file CF that includes content CT on time base, generates a first content file (first composite content file) to be reproduced first on the time base and a second content file (second composite content file) to be reproduced later, and adds information about a position shift on the time base at the reproduction start of each media data included in the second content file to the second content file as synchronizing information.

Furthermore in this case, information about a position shift on the time base at the reproduction end of each media data included in the first content file is added to the first content file as the synchronizing information. Further, file information of the second content file is added to the first content file as the synchronizing information. Further, information about a position shift on the time base at the reproduction end of each media data included in the second content file is added to the second content file as the synchronizing information.

The content editing apparatus 13 divides the content file CF so that a size thereof (file capacity) is reduced to a size that can be received and reproduced by the mobile terminal UE. For example, if a size of a file that can be handled by the mobile terminal UE is 500 kilobytes and a size of a content file CF having a file name "A" shown in FIG. 1 is 1 megabyte, the mobile terminal UE cannot receive the content file CF as long as it is a single file. Therefore, in this case, the content editing apparatus 13 divides the content file CF into two, for example, so as to generate two content files CFB each of which has 500 kilobytes, for example.

In addition, the content editing apparatus 13 adds the synchronizing information to the divided content files CFB when the content file CF is divided. Since the synchronizing information is added, a time shift is not generated between a picture by the video data and a sound by the audio data and a character display by the text data when the divided content file CFB is reproduced by the mobile terminal UE, so that a user of the mobile terminal UE does not feel a shift between them. In addition, a single content file CFB can be reproduced by itself, or a plurality of content files CFB can be reproduced continuously. There is no time shift between a picture and a sound, for example, in any case.

Note that when the synchronizing information is added to the content file CFB, it is possible to combine the individual divided media data and the generated synchronizing information so as to generate a single content file (composite content file) each, similarly. Details thereof will be described later.

Figure 2:
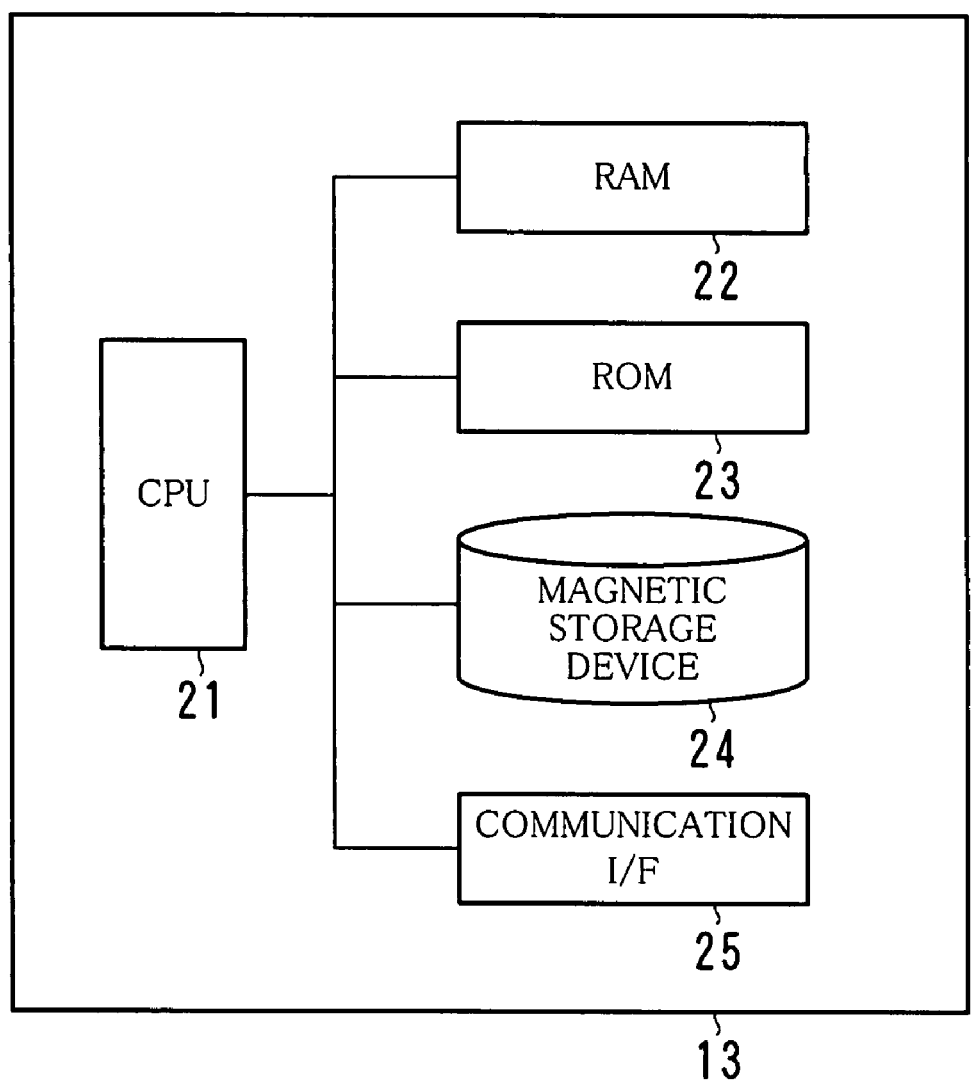
FIG. 2 is a block diagram showing an example of a hardware structure of a content editing apparatus.

As shown in FIG. 2, the content editing apparatus 13 is made up of a CPU 21, a RAM 22, a ROM 23, a magnetic storage device 24, a communication interface 25 and the like. It may also be equipped with an output device such as a display device, a printer or the like, and an input operational device such as a keyboard and a pointing device.

Figure 3:
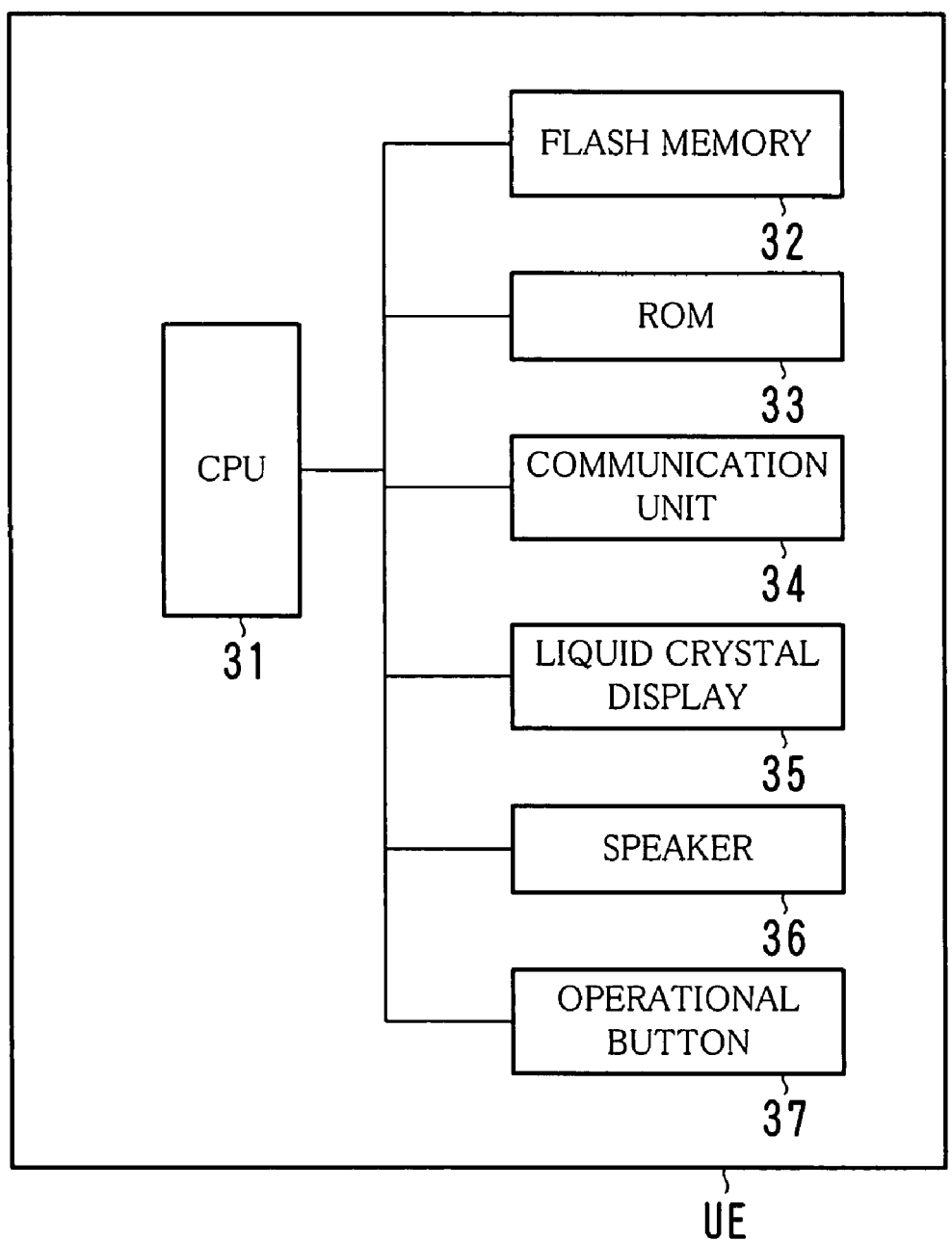
FIG. 3 is a block diagram showing an example of a hardware structure of a mobile terminal.

As shown in FIG. 3, the mobile terminal UE is made up of a CPU 31, a flash memory 32, a ROM 33, a communication unit 34, a display 35, a speaker (or a earphone) 36, an operational button 37 and the like. It may be equipped with a DSP, camera and the like.

Next, an edit process of the content file CF in the content editing apparatus 13 and a reproduction process of the content file CFB in the mobile terminal UE will be described.

Figure 4:
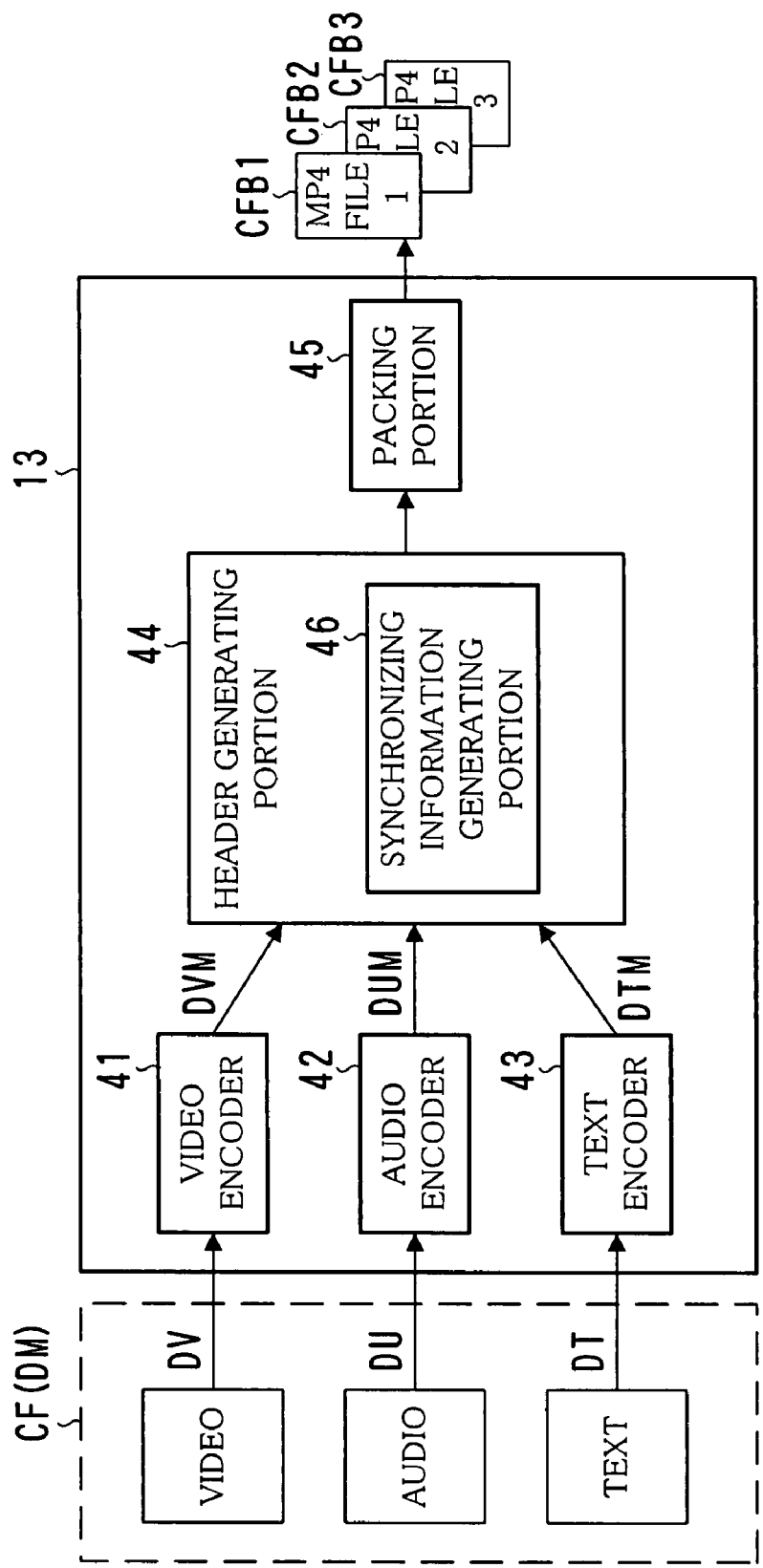
FIG. 4 is a block diagram showing a functional structure of the content editing apparatus.
Figure 5:
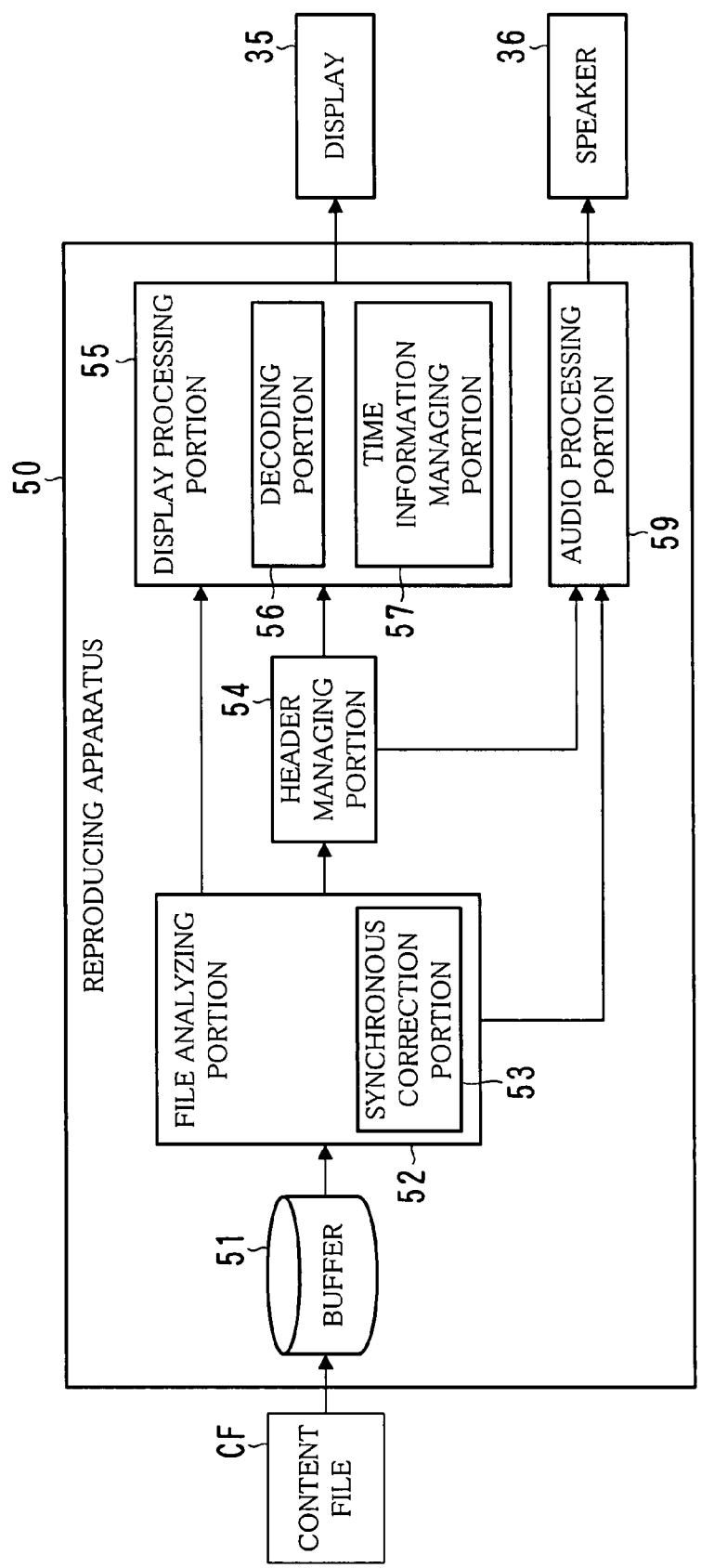
FIG. 5 is a block diagram showing a structure of a reproducing apparatus in single reproduction.
Figure 6:
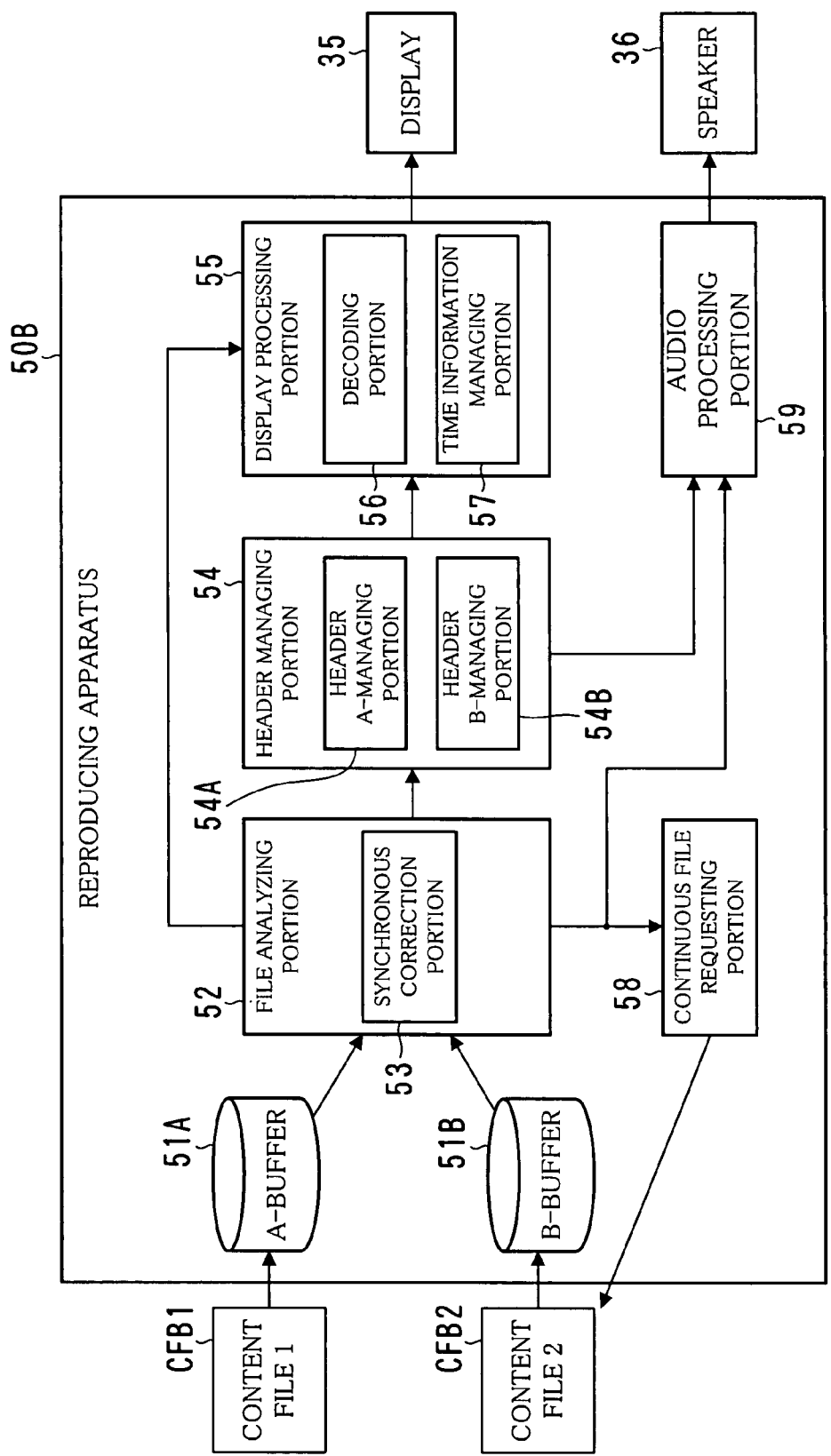
FIG. 6 is a block diagram showing a structure of the reproducing apparatus in continuous reproduction.

FIG. 4 is a block diagram showing a functional structure of the content editing apparatus 13, FIGS. 5 and 6 are block diagrams showing a structure concerning reproducing apparatuses 50 and 50B of the content file CF in the mobile terminal UE. Furthermore, FIG. 5 shows the case where the content file CF is reproduced by itself, while FIG. 6 shows the case where a plurality of content files CF are reproduced continuously.

In FIG. 4, the content editing apparatus 13 includes a video encoder portion 41, an audio encoder portion 42, a text encoder portion 43, a header generating portion 44 and a packing portion 45.

Individual media data DM included in the content file CF, i.e., video data DV, audio data DU and text data DT are entered to the content editing apparatus 13. A set of the video data DV, the audio data DU and the text data DT may be referred to as "media data group." Note that it is possible to provide a memory for storing the content file CF or the individual media data DM thereof temporarily in the content editing apparatus 13.

The video encoder portion 41 encodes the entered video data DV into a desired and appropriate format. The audio encoder portion 42 encodes the entered audio data DU into a desired and appropriate format. The text encoder portion 43 encodes the entered text data DT into a desired and appropriate format.

The header generating portion 44 is provided with a synchronizing information generating portion 46 that generates synchronizing information such as time information, position information or the like for each of the encoded media data when it is divided. The synchronizing information and the reproduction condition information generated in the header generating portion 44 are stored as a header portion in an appropriate memory area of the header generating portion 44.

The packing portion 45 crams media data delivered from the individual encoder portions 41-43 and a header portion delivered from the header generating portion 44 into one or more composite content files so as to be packed. In other words, the packing portion 45 packs the plurality of encoded media data and the header portion and generates one or more composite content files having a predetermined format such as an MP4 file format. The generated composite content files are delivered as content files CFB1, CFB2 and so on.

In FIG. 5, the reproducing apparatus 50 is made up of a buffer 51, a file analyzing portion 52, a synchronous correction portion 53, a header managing portion 54, a display processing portion 55 and the like.

The buffer 51 is a memory area for storing a composite content file that is downloaded to the mobile terminal UE.

The file analyzing portion 52 analyzes the composite content file that is downloaded to the buffer 51, and delivers the header portion thereof to the header managing portion 54. In addition, if the header portion includes the synchronizing information, the synchronous correction portion 53 corrects the reproduction time based on the synchronizing information, so that a time shift is not generated between the media of video and audio or the like.

The header managing portion 54 stores and manages the codec information, the time information, the size information, offset information and the like included in the entered header portion.

The display processing portion 55 refers to sample information that is managed in the header managing portion 54, decodes the entered media data with a decoding portion 56, and displays video and text on the display 35 based on the information in a time information managing portion 57.

In FIG. 6, the reproducing apparatus 50B is made up of two buffers, i.e., an A-buffer 51A and a B-buffer 51B, the file analyzing portion 52, the synchronous correction portion 53, the header managing portion 54, the display processing portion 55, a continuous file requesting portion 58, an audio processing portion 59 and the like.

As to the reproducing apparatus 50B shown in FIG. 6, parts having the same functions as the reproducing apparatus 50 shown in FIG. 5 are denoted by the same references so that description thereof will be omitted.

The A-buffer 51A and the B-buffer 51B are memory areas for storing a plurality of content files CFB1 and CFB2 alternately that are downloaded to the mobile terminal UE.

The file analyzing portion 52 analyzes the content file CFB1 that is downloaded to the A-buffer 51A and delivers a header portion thereof to the header managing portion 54. Then, if the synchronizing information includes continuous file information, it delivers the continuous file information to the continuous file requesting portion 58.

Note that the "continuous file information" corresponds to the "file information" of the present invention. In addition, the "continuous file information" is also information for identifying a media data group to be reproduced continuously.

In addition, the media data is delivered to the display processing portion 55 and to the audio processing portion 59. Using data of the header managing portion 54, a decoding process and a time managing process are performed, which are displayed on the display 35 or a sound is produced from the speaker 36. In this case, if the header portion includes the synchronizing information, the synchronous correction portion 53 performs a process of correcting the head and the last reproduction time information of a video frame in accordance with a correction value. Then the same process is performed for the content file CFB2 that is downloaded to the B-buffer 51B.

After confirming that the first content file CFB has been downloaded, the header managing portion 54 instructs the continuous file requesting portion 58 to download the next content file CFB. Note that a header A-managing portion 54A of the header managing portion 54 manages header information of the content file CFB1 that is downloaded to the A-buffer 51A while a header B-managing portion 54B manages header information of the content file CFB2 that is downloaded to the B-buffer 51B.

The continuous file requesting portion 58 refers to the continuous file information delivered from the file analyzing portion 52 and performs a process of requesting the content delivering server 11 to deliver the next content file CFB that succeeds the content file CFB that is now being processed.

Next, the content editing will be described further in detail.

Figure 7:
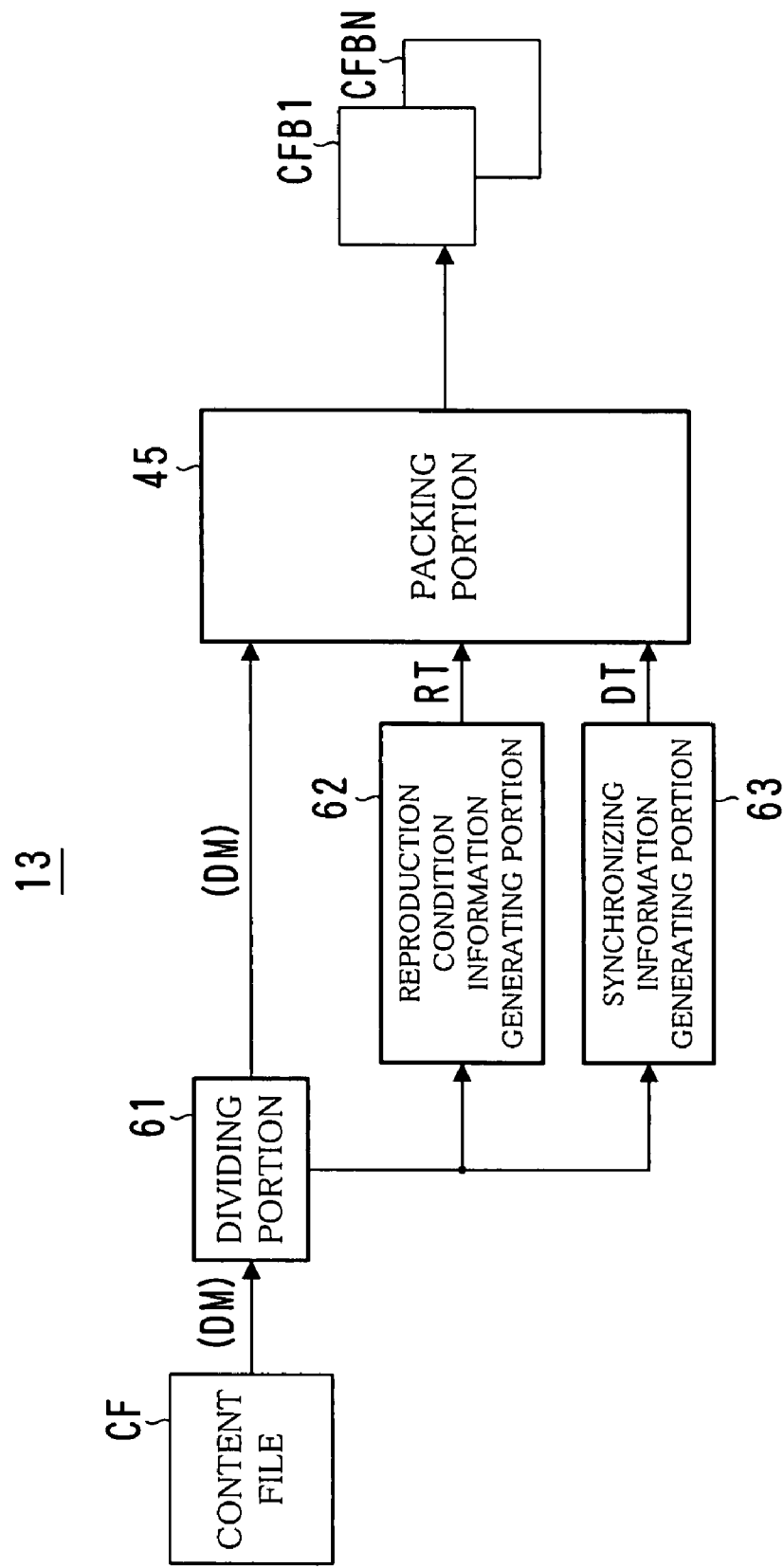
FIG. 7 is a block diagram showing a functional structure of the content editing apparatus.
Figure 9:
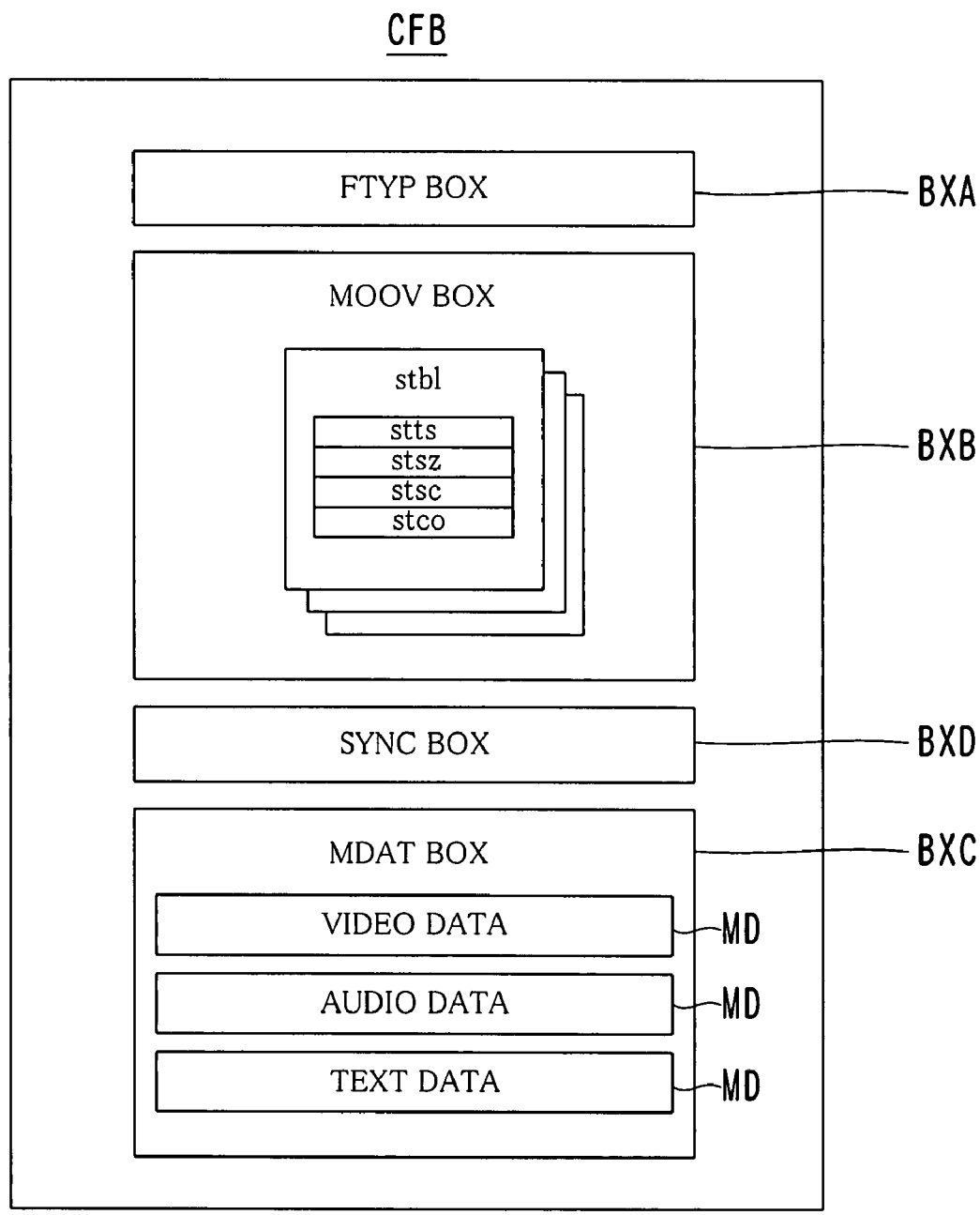
FIG. 9 is a diagram showing an example of a structure of a content file.

FIG. 7 is a block diagram showing a functional structure of the content editing apparatus 13 about the content editing, FIG. 8 is a diagram showing an example of the synchronizing information, and FIG. 9 is a diagram showing an example of a structure of the content file CFB that is generated by the content editing apparatus 13.

In FIG. 7, the content editing apparatus 13 includes a dividing portion 61, a reproduction condition information generating portion 62 and a synchronizing information generating portion 63.

The dividing portion 61 divides each media data included in the content file CF as it is or after appropriate encoding, on the time base, so as to generate first media data (a first media data group) DMA that should be reproduced first on the time base and second media data (a second media data group) DMB that should be reproduced later.

The reproduction condition information generating portion 62 generates reproduction condition information RT that is information for reproducing each of the media data DM. The reproduction condition information RT indicates time information that indicates reproduction time for each frame of each media data DM, size information that indicates a size of each frame of each media data DM, offset information that indicates a place where each frame of each media data DM is stored, chunk information that indicates a unit of chunk of frames, and the like. The reproduction condition information RT and the synchronizing information DT described above constitute a so-called header of each media data DM.

The synchronizing information generating portion 63 generates synchronizing information DT that is the information about a position shift on the time base when each media data DM is reproduced.

As shown in FIG. 8, the synchronizing information DT includes a synchronizing information tag indicating to be synchronizing information, a synchronizing information size that indicates a size of the synchronizing information DT, continuous file information DTF that is information about the composite content file to be reproduced continuously after the composite content file related to the synchronizing information DT, head picture correction information DTT that is the information about a position shift on the time base at the reproduction start of each media data DM, later picture correction information DTB that is the information about a position shift on the time base at the reproduction end of each media data DM, and the like.

In addition, as described above, the packing portion 45 edits (packs) the encoded media data DM, the reproduction condition information RT and the synchronizing information DT to be a single file, so that the content file CFB is generated. In other words, the packing portion 45 adds the synchronizing information DT to the media data DM.

Figure 21:
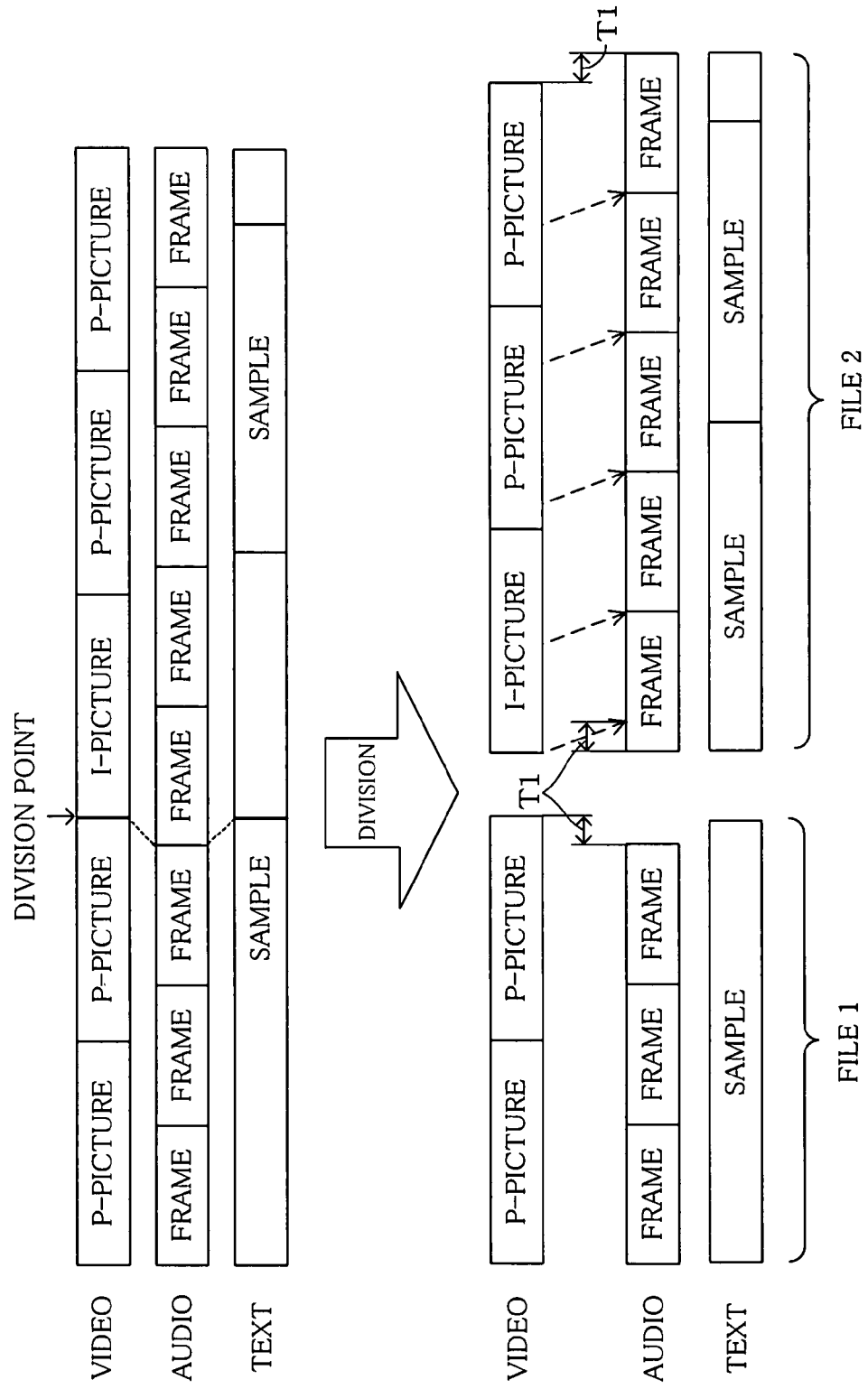
FIG. 21 is a diagram showing an example of a method for dividing the media data.

In FIG. 9, the content file CFB is made up of a file type box BXA, a moov box BXB, a media data box BXC and a synchronizing box BXD. Since some of them have the same functions as the boxes that are described above with reference to FIG. 21, different functions will be described mainly.

The moov box BXB is made up of storage areas stbl for storing the reproduction condition information RT of the individual media data DM. More specifically, each of the storage areas stbl includes an area stts for storing time information that indicates the reproduction time of each frame of each media data DM, an area stsz for storing size information that indicates a size of each frame of each media data DM, an area stsc for storing offset information that indicates a place for storing each frame of each media data DM, and an area stco for storing chunk information that indicates a unit of chunk of frames.

The synchronizing box BXD stores the synchronizing information DT generated by the synchronizing information generating portion 63. Note that the synchronizing box BXD is newly defined and provided in the present embodiment as an extension area of the MP4.

Next, a concrete example of the file editing (composite content file editing) will be described.

Figure 10:
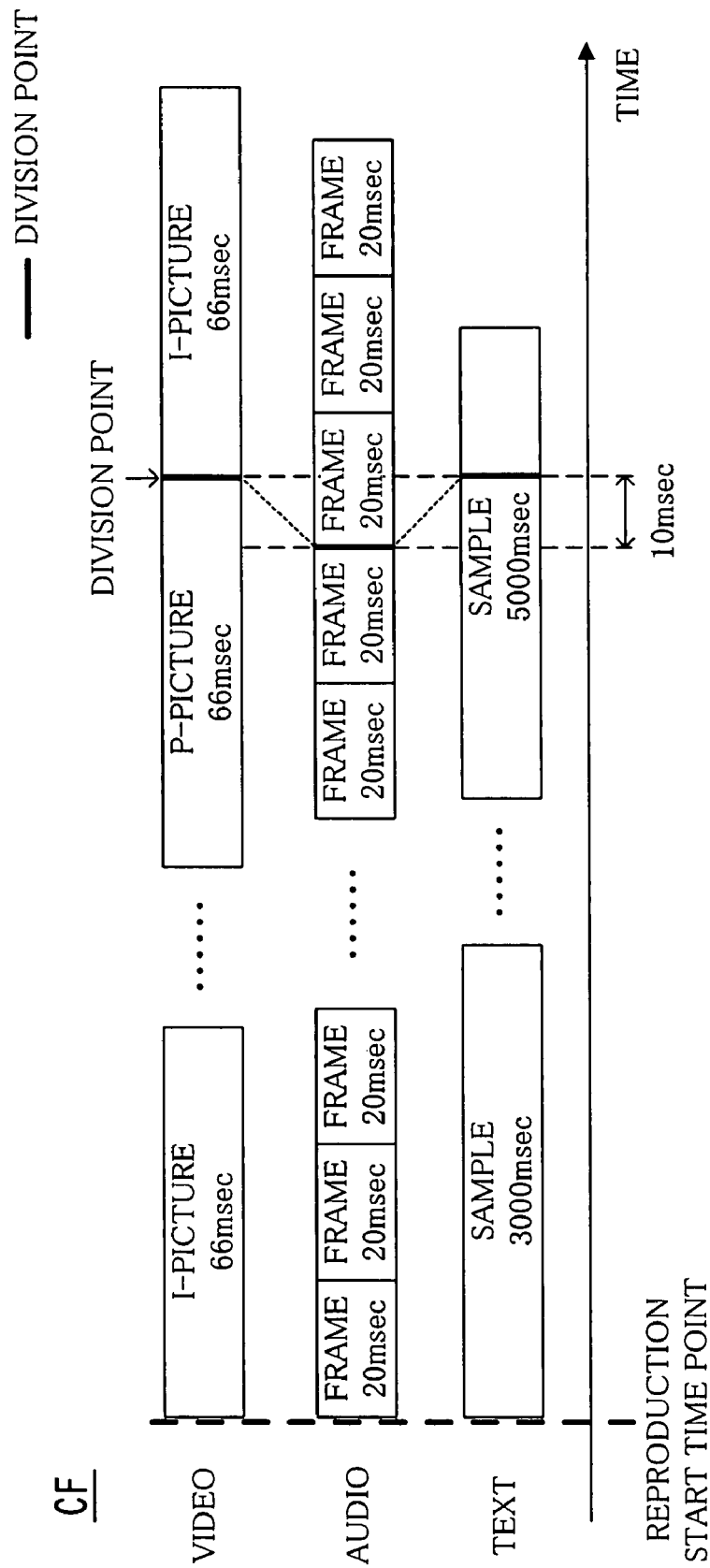
FIG. 10 is a diagram showing an example of division of media data of the content file.
Figure 11:
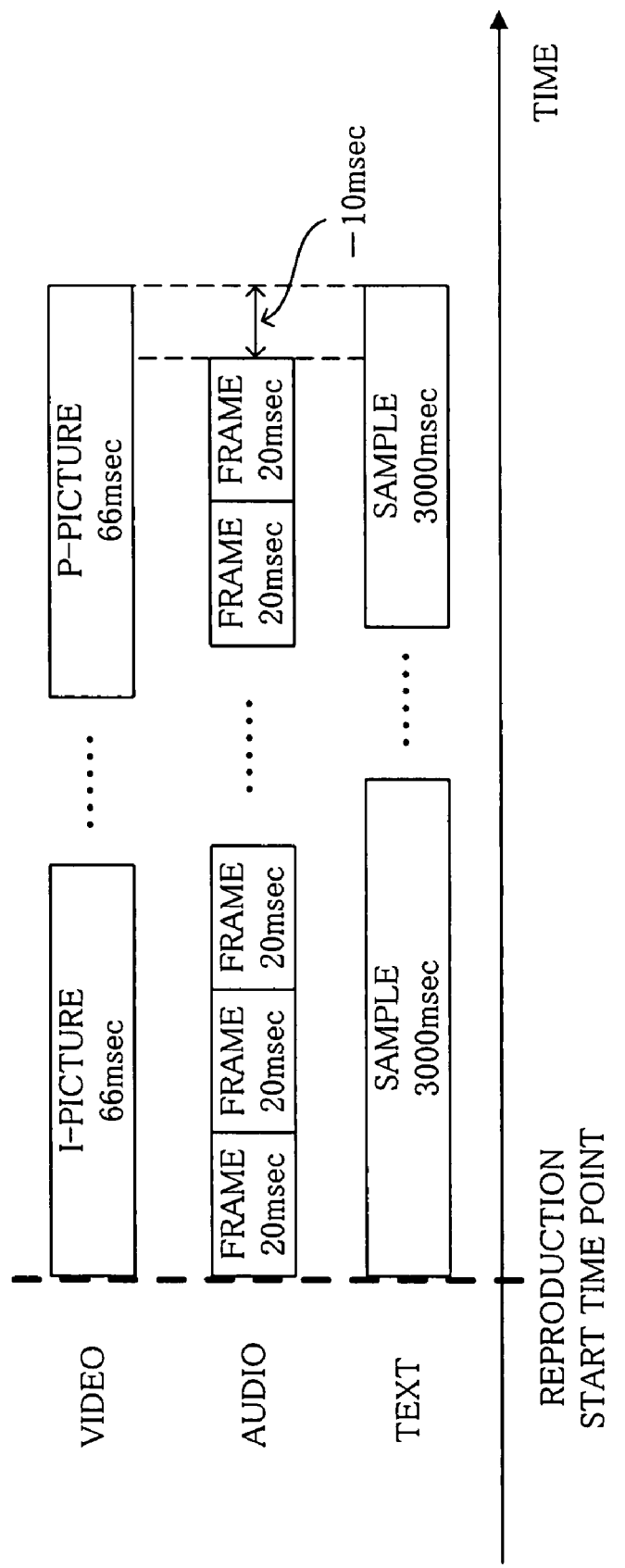
FIG. 11 is a diagram showing an example of first media data after the division.
Figure 12:
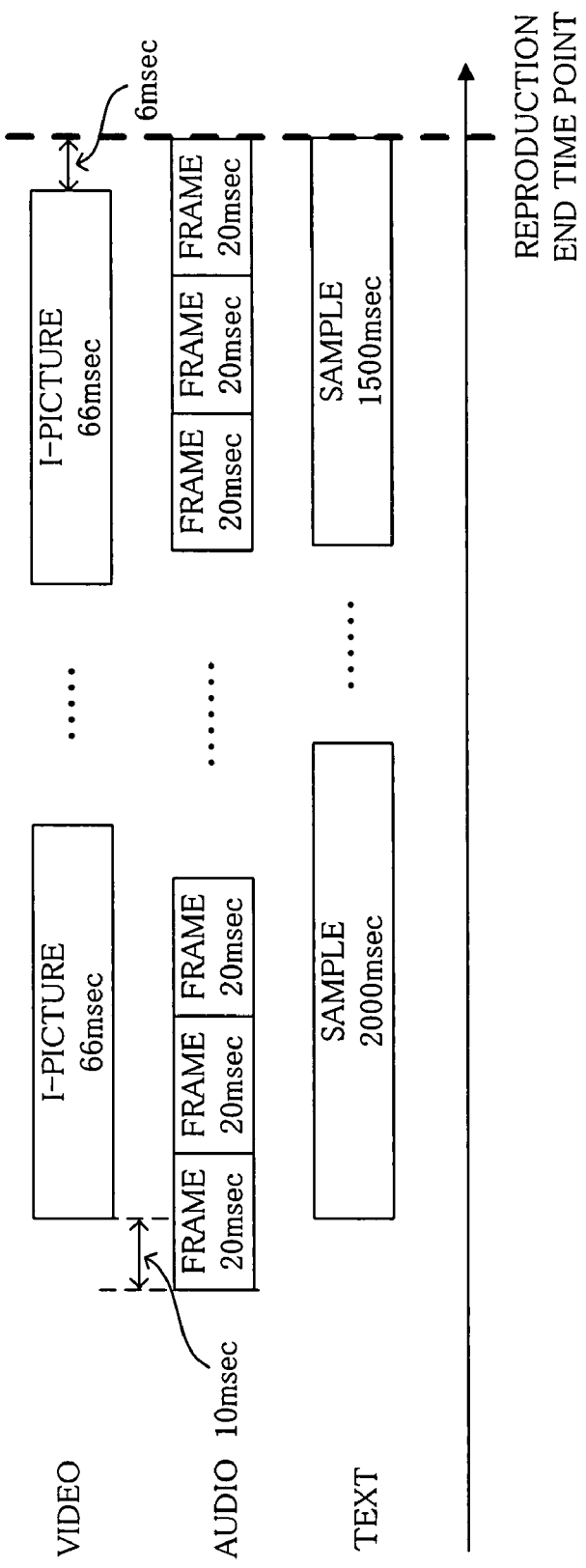
FIG. 12 is a diagram showing an example of second media data after the division.

FIG. 10 is a diagram showing an example of division of the media data DM of the content file CF, FIG. 11 is a diagram showing an example of first media data DMA after the division, FIG. 12 is a diagram showing an example of second media data DMB after the division, FIG. 13 is a diagram showing an example of synchronizing information DT1 and DT2 about the content file CFB after the division. Note that the first media data DMA constitutes the first content file CFB1 while the second media data DMB constitutes the second content file CFB2.

In FIG. 10, a division point of the video data is determined first. Then, a division point of the audio data is determined to be a boundary between frames that is closest to a position corresponding to the division point of the video data. A division point of the text data is determined to be a position corresponding to the division point of the video data. Thus, division points of each media data are determined, and each media data DM are divided at each of the division points.

Note that although FIG. 10 shows the example where each media data DM is divided into two, it is possible to divide each media data DM into three or more. The number of division should be determined so that the content file CFB after the division becomes a size that can be delivered to the mobile terminal UE.

In addition, the head picture correction information TDT and the later picture correction information BDT (see FIG. 8) that are the synchronizing information DT are generated by calculating the position shift on the time base at the reproduction start and at the reproduction end of the video data and the audio data.

For example, when each media data DM is divided as shown in FIG. 10, it is necessary to pay attention first to the position shift on the time base between the video data and the audio data that should be reproduced first on the time base at the reproduction end.

In this case, as shown in FIG. 11, the position on the time base of the video data at the reproduction end is longer than (delayed from) that of the audio data by 10 milliseconds. For this reason, reproduction of the P-picture of the video data at the reproduction end should be finished earlier by 10 milliseconds for synchronization between the video data and the audio data at the reproduction end.

Therefore, the later picture correction information DTB1 of the synchronizing information DT1 of the first content file CFB1 becomes "−10 milliseconds" (see FIG. 13). As to the head picture correction information DTT1, since there is no position shift on the time base between the video data and the audio data at the reproduction start, it becomes "0".

As to the video data and the audio data that are stored in the second content file CFB2, as shown in FIG. 12, the position on the time base of the video data at the reproduction start is shorter than (delayed from) that of the audio data by 10 milliseconds. In addition, the position on the time base of the video data at the reproduction end is shorter (earlier) than that of the audio data by 6 milliseconds. For this reason, it is necessary to extend the reproduction time of the I-picture of the video data at the reproduction start by 10 milliseconds and to extend also the reproduction time of the P-picture of the video data at the reproduction end by 6 milliseconds, for synchronization between the video data and the audio data at the reproduction. Therefore, the head picture correction information DTT2 of the synchronizing information DT2 of the second content file CFB2 becomes "10 milliseconds" and the later picture correction information DTB2 becomes "6 milliseconds" (see FIG. 13).

As to the continuous file information DTF1 of the first content file CFB1, a URL (Uniform Resource Locator) that indicates a location for storing the second content file CFB2 or the like can be used. In addition, if there is no file to be reproduced next continuously like the second content file CFB2, the continuous file information DTF2 becomes "Null".

Next, content reproduction (composite content file reproduction) will be described further in detail.

Figure 14:
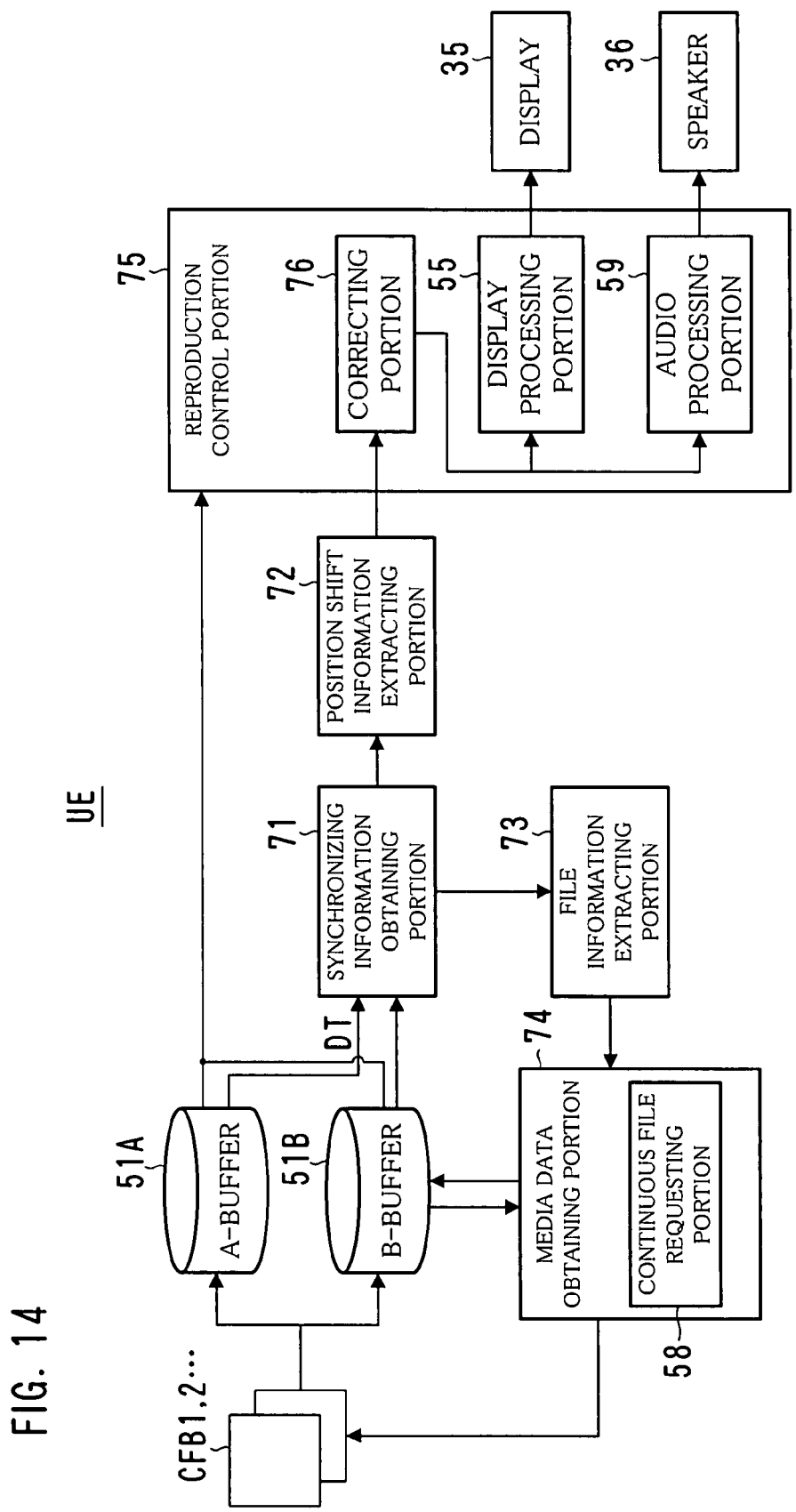
FIG. 14 is a diagram showing a functional structure of the mobile terminal about reproduction of content.

FIG. 14 is a diagram showing a functional structure of the mobile terminal UE about the content reproduction.

In FIG. 14, the mobile terminal UE includes a synchronizing information obtaining portion 71, a position shift information extracting portion 72, a file information extracting portion 73, a media data obtaining portion 74, a reproduction control portion 75, a correcting portion 76 and the like.

The synchronizing information obtaining portion 71 obtains the synchronizing information DT that is added to the content file CFB downloaded to the A-buffer 51A or the B-buffer 51B.

The position shift information extracting portion 72 extracts information about a position shift on the time base (the head picture correction information DTT and the later picture correction information DTB) of each media data DM during the reproduction from the synchronizing information DT.

The file information extracting portion 73 extracts the continuous file information DTF that is file information of the content file CFB to be reproduced continuously after the content file CFB from the synchronizing information DT.

The media data obtaining portion 74 reads out the next composite content file based on the extracted continuous file information DTF and obtains the media data DM that succeeds it for each media data DM that has been reproduced among the individual media data DM included in the content file CFB that is being reproduced, so that it is reproduced continuously when the reproduction of the content file CFB that is being reproduced is finished.

The reproduction control portion 75 performs a process and a control for reproducing the media data DM of the content file CFB.

The correcting portion 76 corrects the reproduction time of the each media data DM during the reproduction based on the extracted information about a position shift on the time base. When the correction is performed, if no continuous file information DTF is extracted from the synchronizing information DT, correction of the reproduction time at the reproduction end of each media data DM included in the content file CFB is performed. In other words, if the continuous file information DTF is extracted from the synchronizing information DT, the correction is not performed when the content file CFB is reproduced.

Next, a concrete example of the content reproduction will be described. First, the continuous reproduction will be described.

Figure 15:
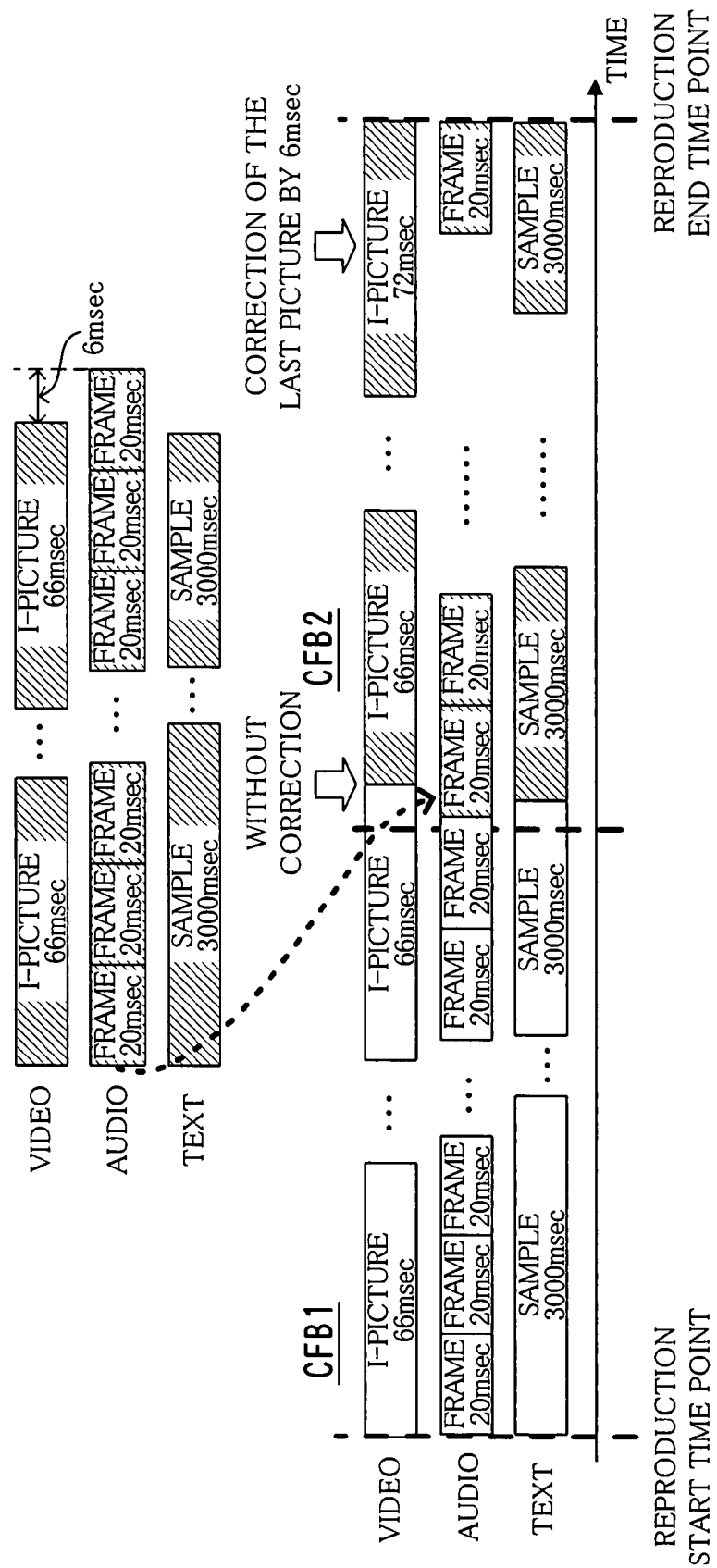
FIG. 15 is a diagram showing an example of correction in the continuous reproduction.

FIG. 15 is a diagram showing an example of the correction in the continuous reproduction.

In FIG. 15, since the synchronizing information DT1 of the first content file CFB1 includes the continuous file information DTF1 (see FIG. 13), the second content file CFB2 to be reproduced next continuously is reproduced continuously. In other words, for each media data DM that has been reproduced among the individual media data DM of the first content file CFB1, end of the other media data DM is not waited, but the media data DM to be reproduced next is read out from the buffer and is reproduced continuously without an interval.

In the example shown in FIG. 15, just after the last P-picture of the video data DV of the first content file CFB1 is reproduced for a regular time period, the first I-picture of the second content file CFB2 is reproduced for a regular time period in the same manner. As to the audio data DU and the text data DT, the first frame of the second content file CFB2 is reproduced following the last frame of the first content file CFB1.

When the second content file CFB2 is reproduced, the synchronizing information DT2 checks whether or not there is a content file CFB to be reproduced next. Since there is no continuous file information DTF2 (see FIG. 13), it is recognized that the second content file CFB2 is the last. In this case, the correction is performed, if necessary, only at the reproduction end of the second content file CFB2.

In this way, the content files CFB1 and CFB2 divided by the content editing apparatus 13 are reproduced in the mobile terminal UE so that the individual media data DM can be reproduced continuously, and the correction is performed, if necessary, at the reproduction end. As a result, a user of the mobile terminal UE does not feel any change compared to the case where the original content file CF is reproduced at it is. In addition, even if time lengths of the individual media data DM are different in the original content file CF, incongruity feeling is canceled since the correction is performed when the reproduction is finished.

Next, a case where the content files CFB1 and CFB2 are reproduced in a single manner will be described.

Figure 16:
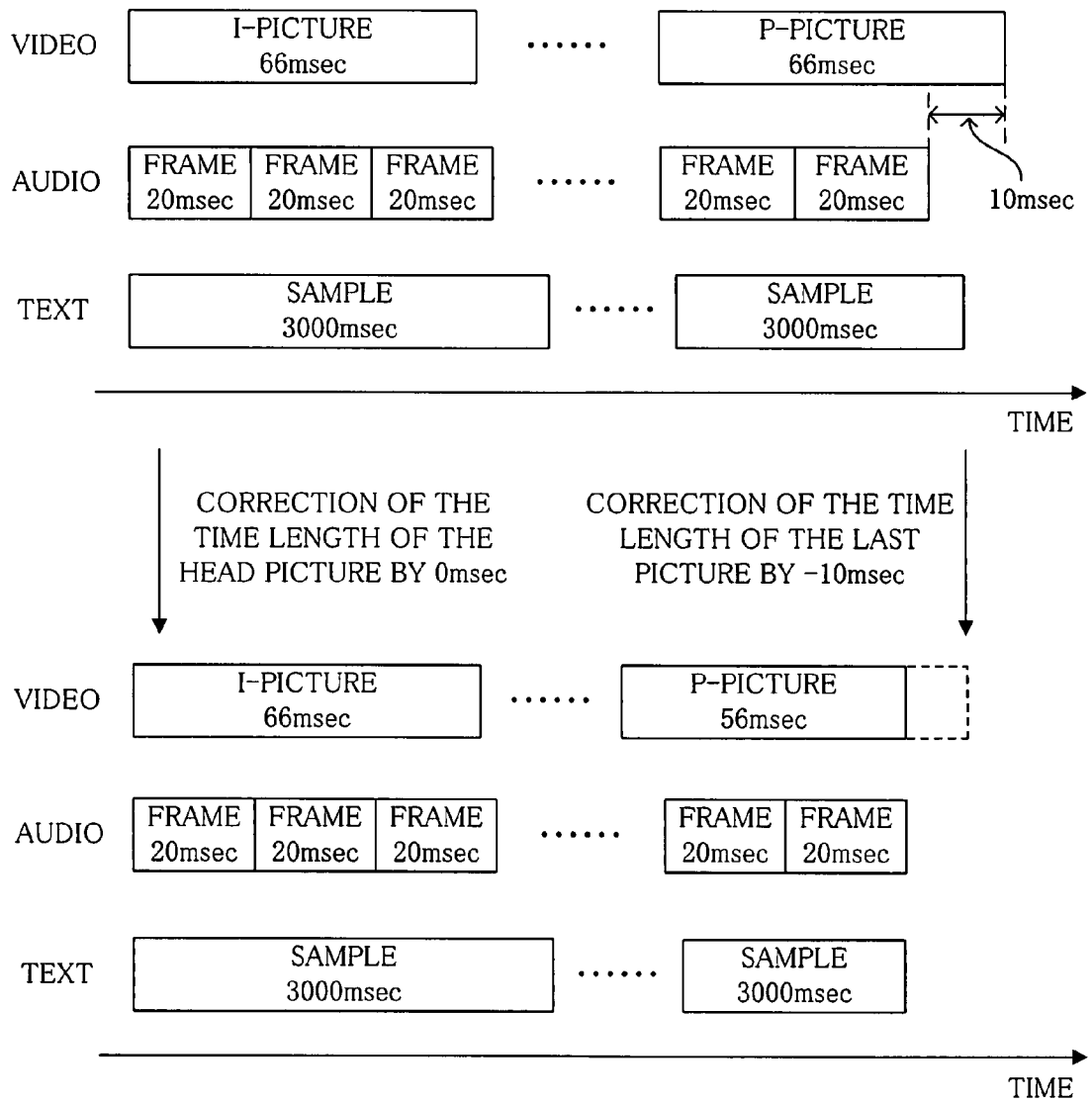
FIG. 16 is a diagram showing an example of correction in the single reproduction of the first content file.
Figure 17:
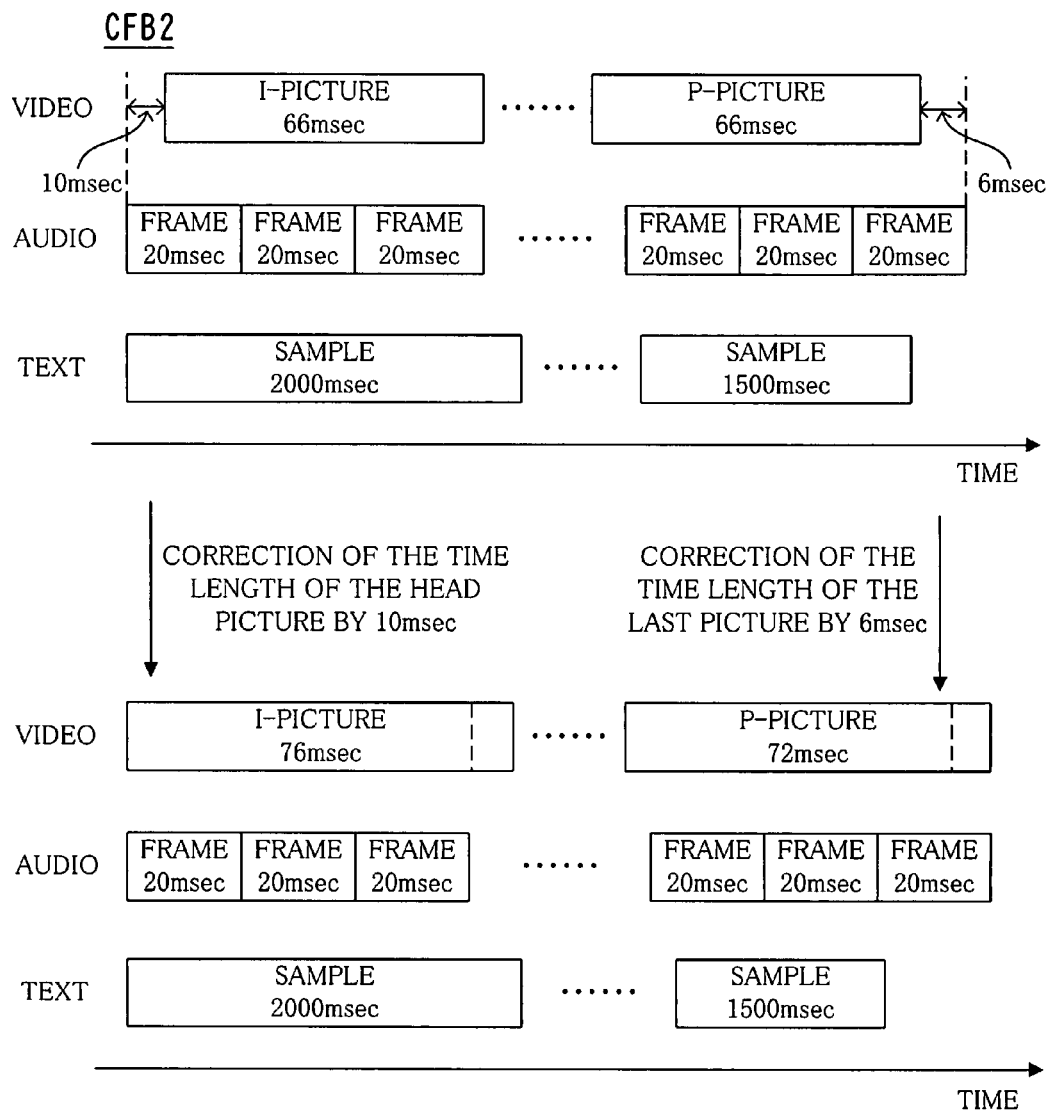
FIG. 17 is a diagram showing an example of correction in the single reproduction of the second content file.

FIG. 16 is a diagram showing an example of the correction of the first content file CFB1 in the single reproduction, and FIG. 17 is a diagram showing an example of the correction of the second content file CFB2 in the single reproduction.

In FIG. 16, as to the single reproduction of the first content file CFB1, a process of correcting a position shift on the time base of each media data DM is performed based on the synchronizing information DT1. According to the synchronizing information DT1, the head picture correction information DTT1 is "0" and the later picture correction information DTB1 is "−10 milliseconds" (see FIG. 13). Therefore, the correction is not performed at the reproduction start of the video data DV. At the reproduction end thereof, the reproduction time of the P-picture is corrected to be shortened from 66 milliseconds to 56 milliseconds. For this purpose, a reproduction speed is increased so that the reproduction of the last P-picture can be finished in 56 milliseconds, for example. Thus, shifts of position on the time base among the video data DV, the audio data DU and the text data DT at the reproduction end can be cancelled, so that synchronization can be taken.

In FIG. 17, according to the synchronizing information DT2, the head picture correction information DTT2 is "10 milliseconds" and the later picture correction information DTB2 is "6 milliseconds". Therefore, the reproduction time of the I-picture at the reproduction start of the video data is corrected from 66 milliseconds to 76 milliseconds, and the reproduction time of the P-picture at the reproduction end is corrected from 66 milliseconds to 72 milliseconds. For this purpose, the reproduction of the first I-picture is started at the same time as the audio data DU, and a reproduction speed is decreased so that the reproduction time becomes 76 milliseconds, for example. In addition, a reproduction speed of the last P-picture is decreased so that the reproduction time becomes 72 milliseconds.

In this way, if the divided content file CFB is reproduced in a single manner, correction of the position shift on the time base is performed so that there is no shift among all the media data DM at the reproduction start and the reproduction end without any shift. Thus, a user does not feel a shift between a picture and a sound when they are reproduced.

Note that when the divided content files CFB are reproduced by the mobile terminal UE, a series of content files CFB1, CFB2, CFB3 and so on are usually reproduced continuously and sequentially. In this case, the correction is performed, if necessary, so that positions on the time base match to each other at the reproduction end of the last content file CFB.

If a user wants to reproduce the divided content file CFB in a single manner, a button (not shown) that is provided to the mobile terminal UE is operated so that a "single reproduction mode" is selected, and the single reproduction as described above is performed. Further in this case, it is preferable to provide a button for selecting a content file to be reproduced in a single manner from the divided plurality of content files CFB1, CFB2, CFB3 and so on.

As described above, according to the file editing and content reproducing method of the present embodiment, when any of the single reproduction and the continuous reproduction of the content CT is performed by the mobile terminal UE, a user can watch and listen to the content CT without incongruity feeling since synchronization between them is not lost.

Further, since the synchronizing information DT that is provided for synchronization has a small capacity like a few bytes, a process load is scarcely increased by providing the synchronizing information DT. It can be realized easily by adding such a function to the conventional content delivering system 1.

Next, the file editing and the content reproduction will be described with reference to flowcharts.

Figure 18:
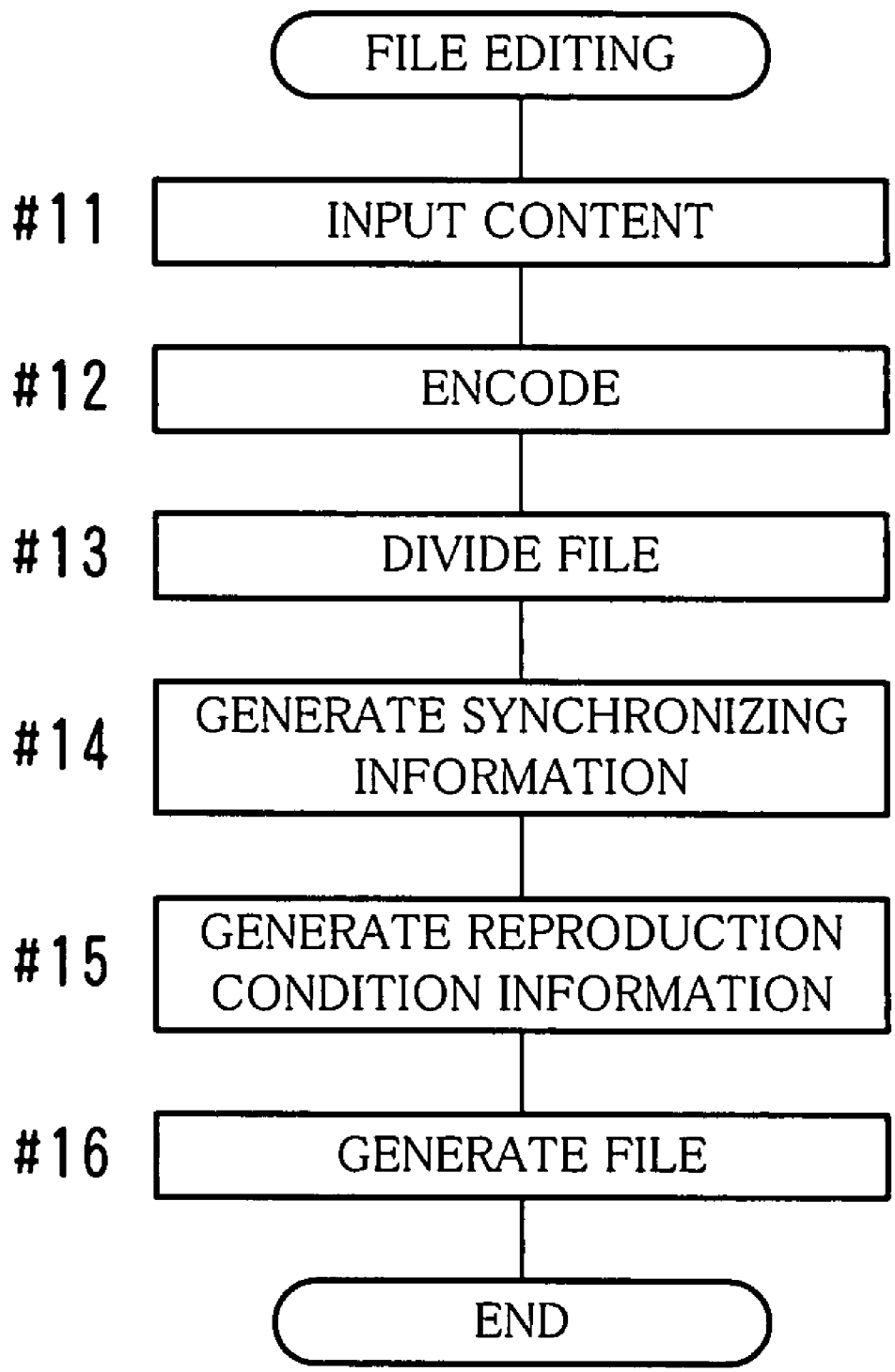
FIG. 18 is a flowchart showing a general flow of file editing.
Figure 19:
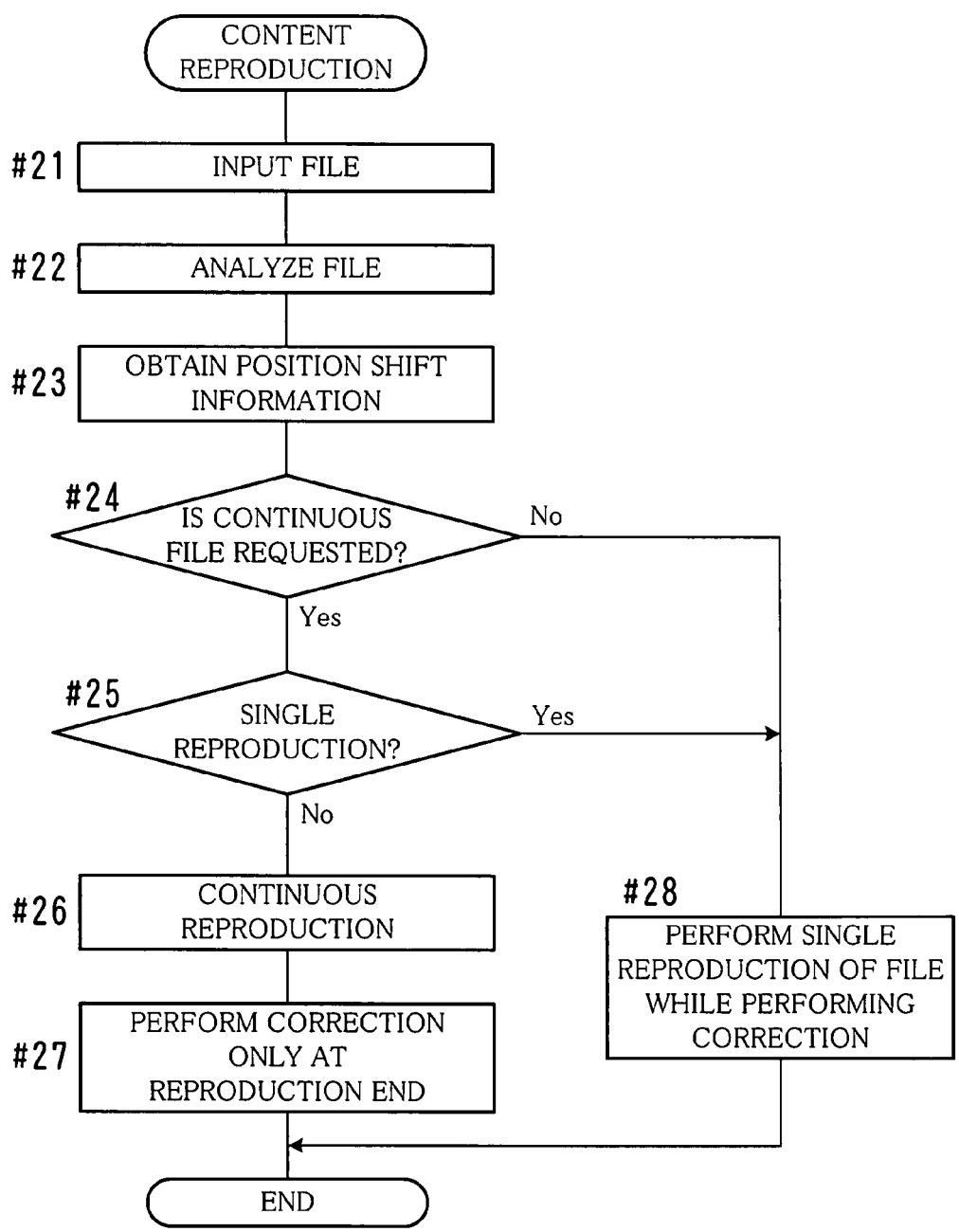
FIG. 19 is a flowchart showing a general flow of content reproduction.
Figure 20:
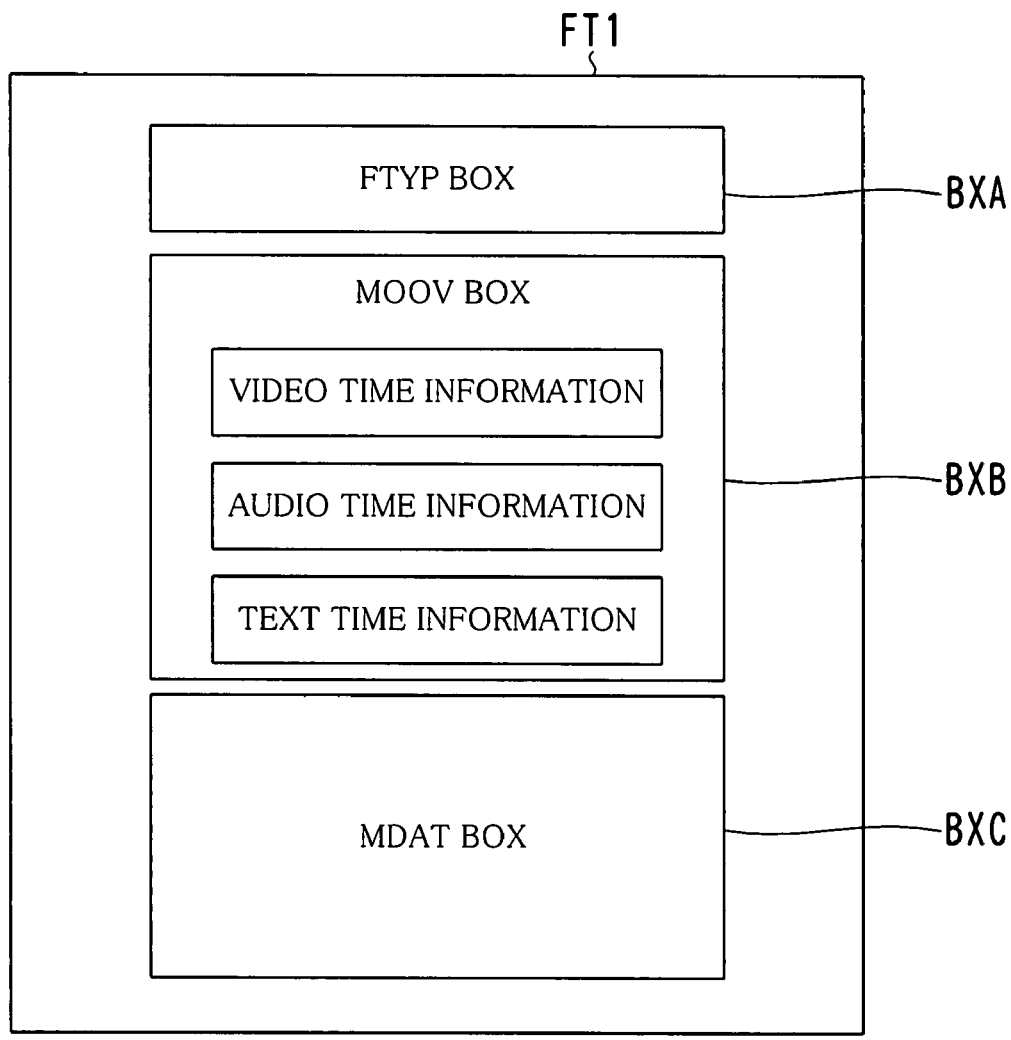
FIG. 20 is a diagram showing an example of a conventional MP4 file format.

FIG. 18 is a flowchart showing a general flow of the file editing, and FIG. 19 is a flowchart showing a general flow of the content reproduction.

In FIG. 18, when the content CT or the content file CF to be edited is supplied (#11), encoding is performed, if necessary (#12). Each media data is divided on the time base so that a plurality of media data groups are generated (#13). Information about a position shift on the time base of each media data and information for identifying a media data group to be reproduced next continuously are generated as the synchronizing information for each media data group (#14). In addition, the reproduction condition information RT is generated (#15). Individual media data groups and the synchronizing information for individual media data groups are combined so as to generate a plurality of content files CFB (#16).

In FIG. 19, when the content file CFB is supplied (#21), file analysis is performed so that the synchronizing information DT is obtained (#22). If there is information about a position shift on the time base during reproduction of each media data among the synchronizing information DT, it is extracted (#23). It is checked whether or not there is continuous file information DTF, and it is obtained if there is (#24). If there is continuous file information DTF, the continuous reproduction is performed (#26) in the case where it is not the single reproduction mode (No in #25) so that necessary correction is performed only at the reproduction end (#27).

If there is no continuous file information DTF (No in #24), or it is the single reproduction mode (Yes in #25), the reproduction is performed while correcting the reproduction time of each media data based on the extracted information about a position shift on the time base (#28).

In the embodiment described above, the structure of the whole or each part of the content editing apparatus 13, the reproducing apparatus 50, the content delivering system 1 or the mobile terminal UE, the process contents, the process order, the structures of the content files CF and CFB, the structure of the synchronizing information DT and the like can be modified if necessary in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A composite content file editing method for editing a composite content file in which a plurality of types of media data are multiplexed, the composite content file having a header portion in which reproduction conditions including time information indicating reproduction time lengths for each type of the media data are stored and also a media data portion provided separately from the header portion and storing therein the media data, the method comprising:

dividing each media data included in the composite content file on the time base so as to generate a first composite content file to be reproduced first on the time base and a second composite content file to be reproduced later, each of said composite content files comprising a group of media data;

adding to the first composite content file, as synchronizing information, information about a position shift on the time base at reproduction start and reproduction end of video data that is one type of said group of media data included in the first composite content file, and file information of the second composite content file; and adding to the second composite content file, as synchronizing information, information about a position shift on the time base at reproduction start and reproduction end of video data that is one type of said group of media data included in the second composite content file.

2. A composite content file editing apparatus for editing a composite content file in which a plurality of types of media data are multiplexed, the composite content file having a header portion in which reproduction conditions including time information indicating reproduction time lengths for each type of the media data are stored and also a media data portion provided separately from the header portion and storing therein the media data, the apparatus comprising:

a dividing portion that divides each media data included in the composite content file on the time base so that a first composite content file to be reproduced first on the time base and a second composite content file to be reproduced later are generated, each of said composite content files comprising a group of media data; and a synchronizing information adding portion that adds to the first composite content file, as synchronizing information, information about a position shift on the time base at reproduction start and reproduction end of video data that is one type of said group of media data included in the first composite content file, and file information of the second composite content file, and adds to the second composite content file, as synchronizing information, information about a position shift on the time base at reproduction start and reproduction end of video data that is one type of said group of media data included in the second composite content file.

\* \* \* \* \*